United States Patent [19]

Hughes et al.

[11] 4,200,927
[45] Apr. 29, 1980

[54] MULTI-INSTRUCTION STREAM BRANCH PROCESSING MECHANISM

[75] Inventors: Jeffrey F. Hughes, Ulster Park; John S. Liptay, Rhinebeck; James W. Rymarczyk; Stanley E. Stone, both of Poughkeepsie, all of N.Y.

[73] Assignee: International Business Machines Corporation, Armonk, N.Y.

[21] Appl. No.: 866,686

[22] Filed: Jan. 3, 1978

[51] Int. Cl.² ............................................. G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,418,638 | 12/1968 | Anderson et al. | 364/200 |
| 3,551,895 | 12/1970 | Driscoll, Jr. | 364/200 |
| 3,699,526 | 10/1972 | Iskiyan et al. | 364/200 |
| 3,940,741 | 2/1976 | Horikoshi et al. | 364/200 |

Primary Examiner—Raulfe B. Zache

Attorney, Agent, or Firm—Robert W. Berray

[57] ABSTRACT

In a high-performance computer which prefetches and predecodes instructions for sequential presentation to an execution unit, at least three separately gated and sequenced multi-instruction buffers for prefetched instructions permit continued sequential predecoding and buffering of instructions from three independent instruction streams identified by multiple branch instructions, some of which may be conditionally executed. A number of stored pointers identify particular ones of the multiple instruction buffers. Various branch instructions are predicted to be successful or unsuccessful. Result signals from the instruction execution unit, in response to execution of conditional branch instructions, will control the setting of various pointers and busy triggers associated with each instruction buffer, causing the next sequential instruction transferred to the instruction execution unit to be from the proper instruction stream based on the result of the branch on condition instruction.

8 Claims, 18 Drawing Figures

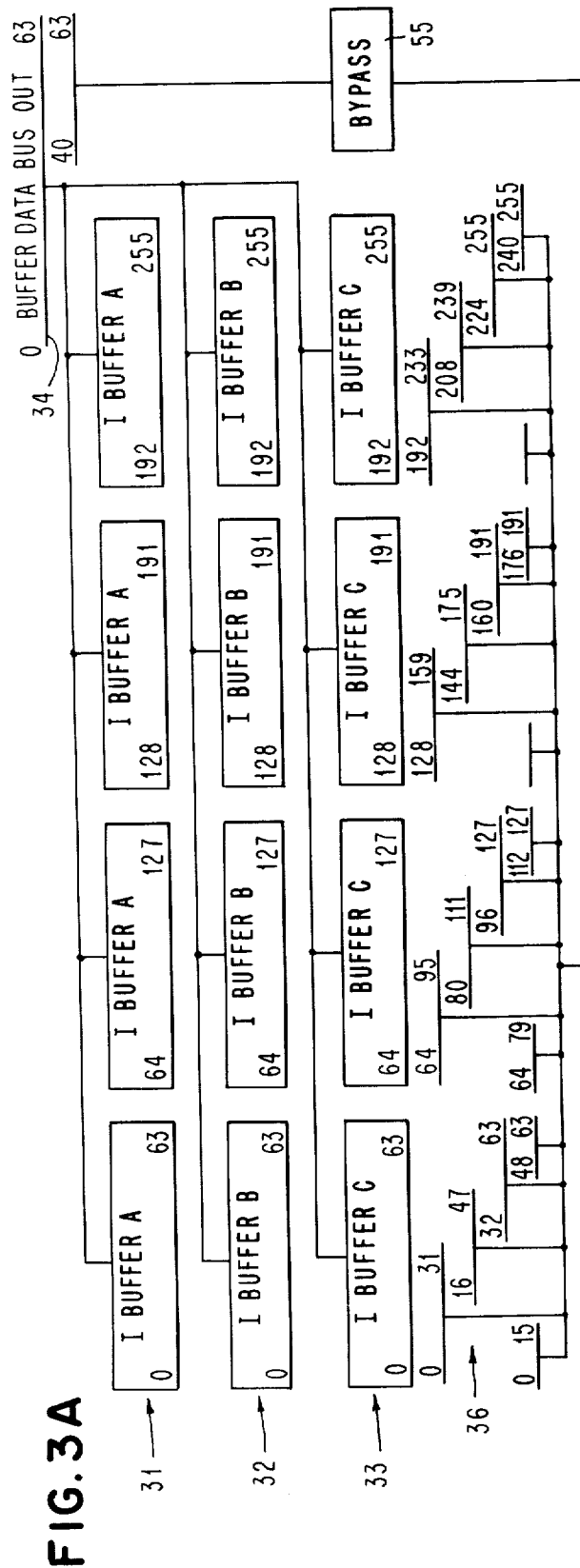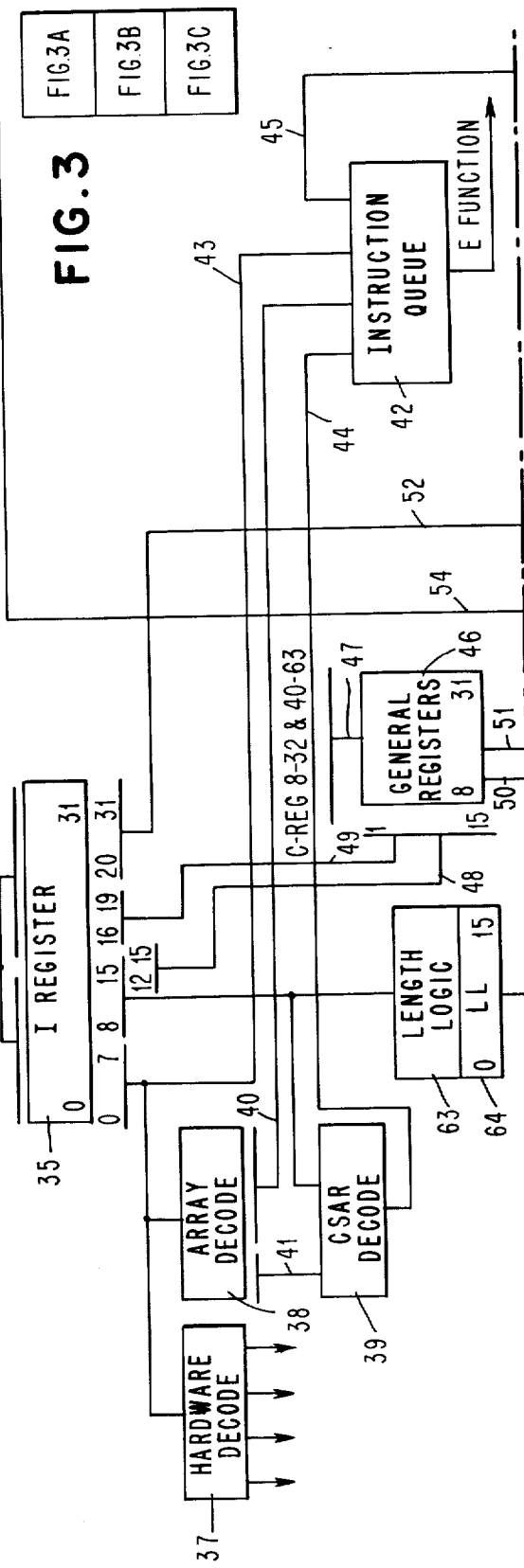

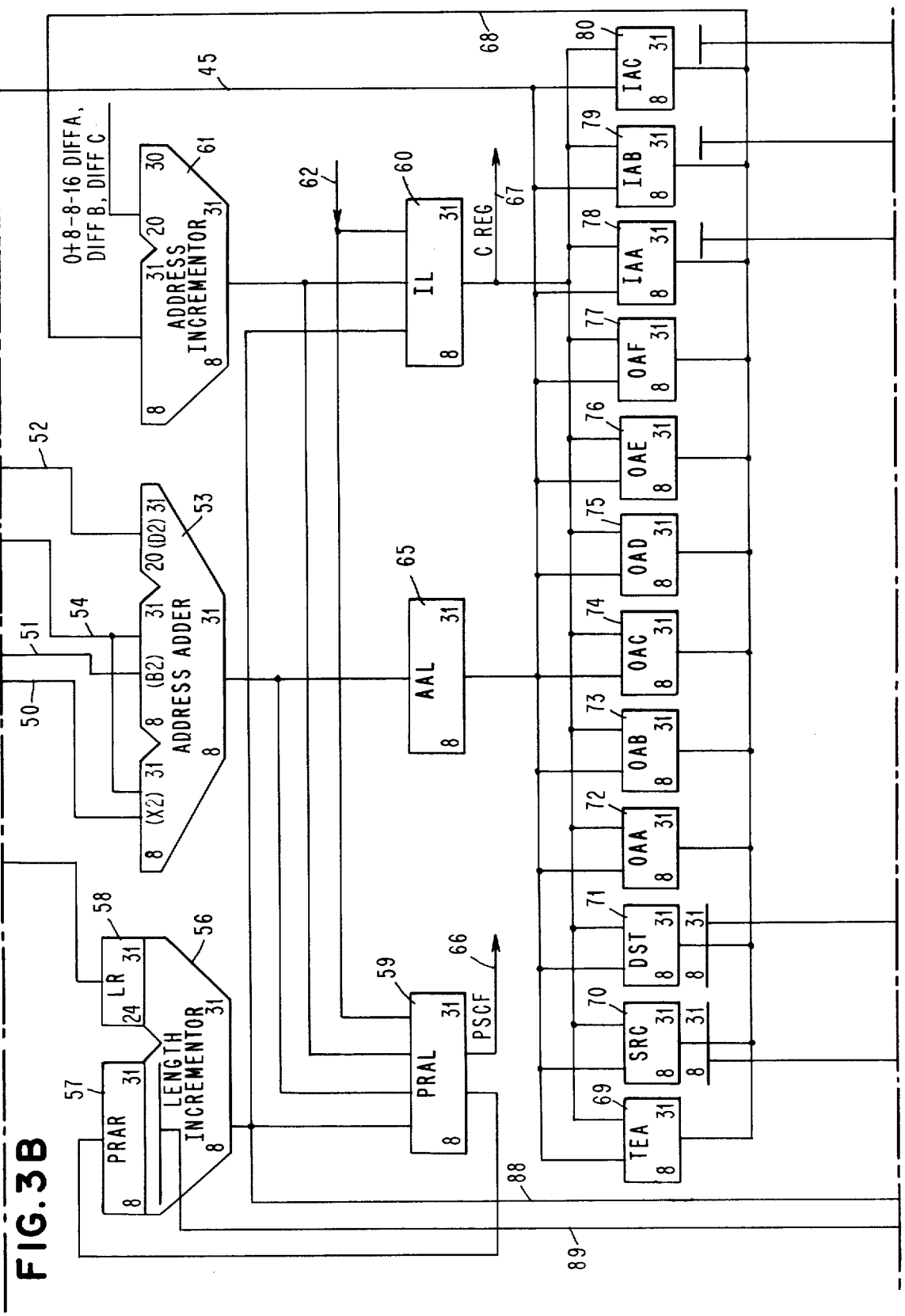

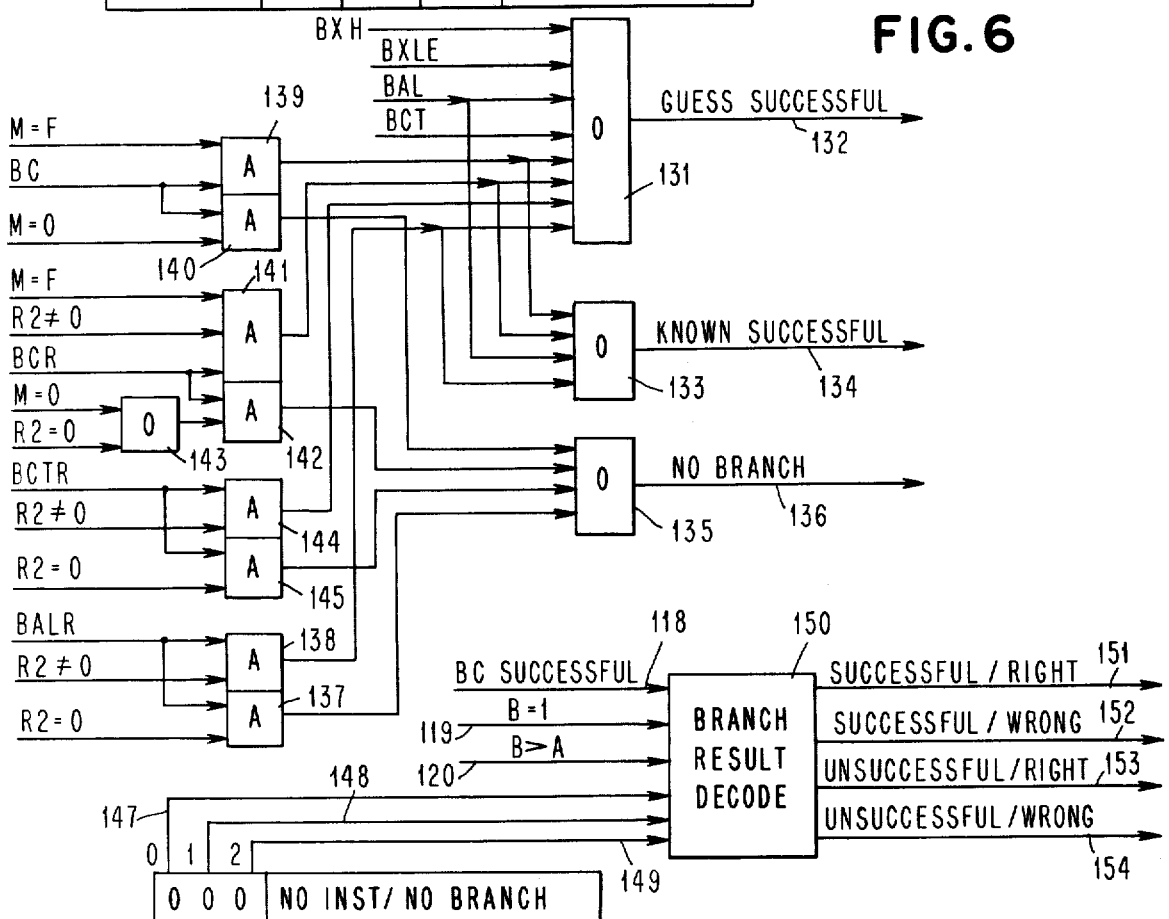

BRANCH RESULT DECODE

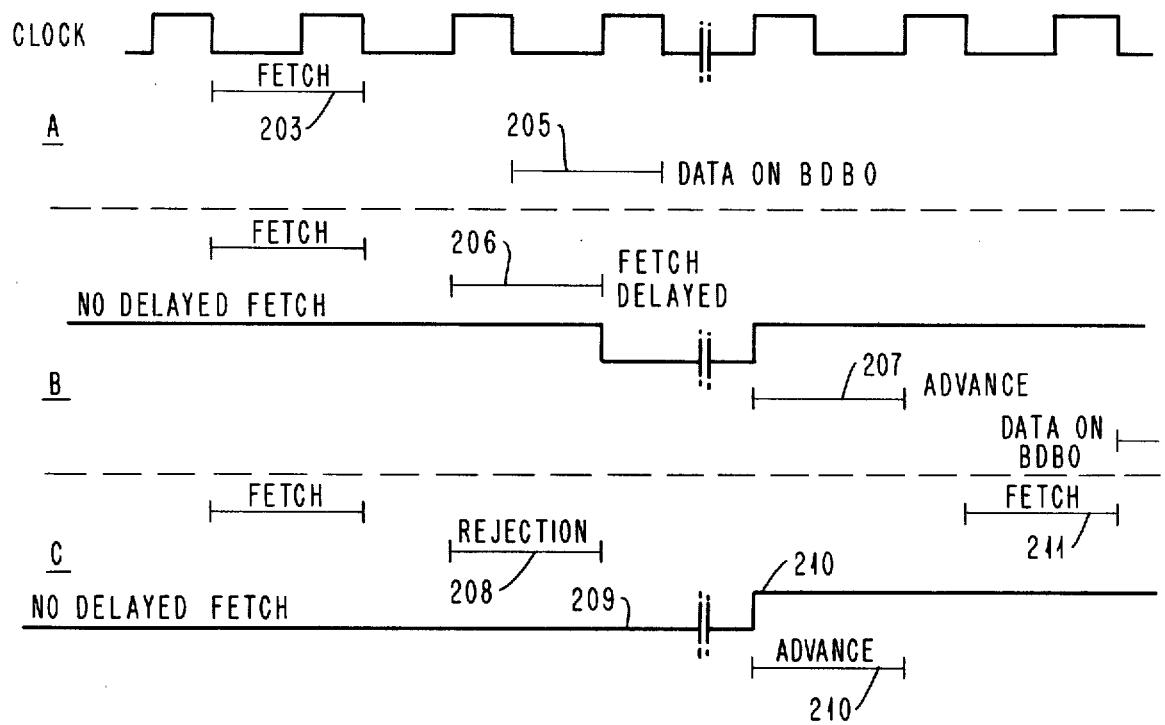
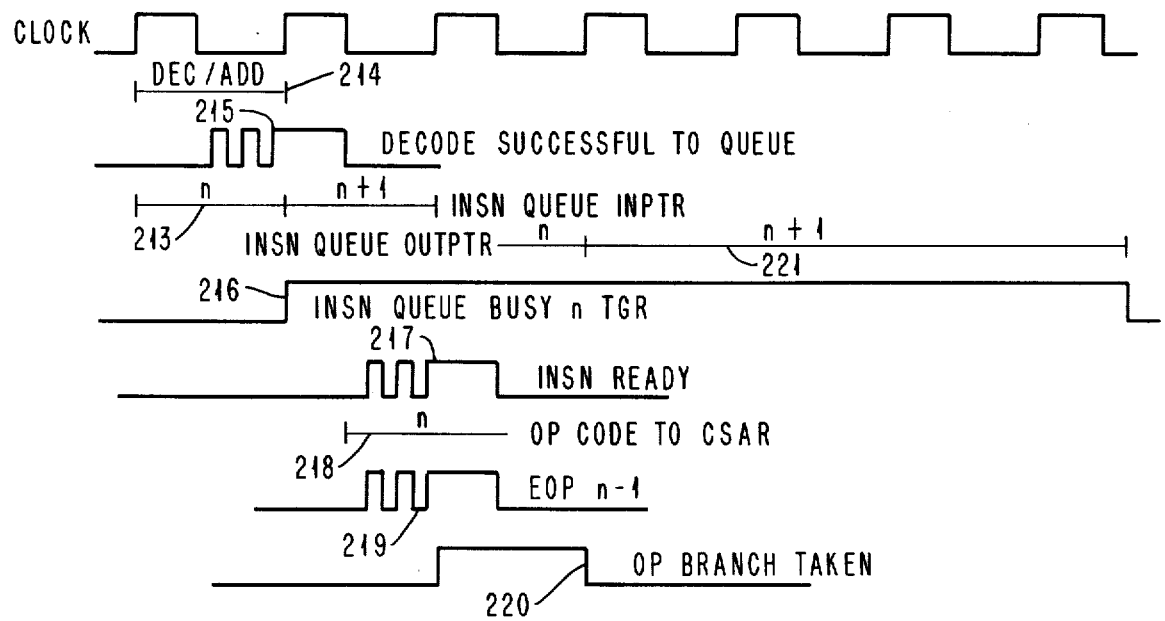

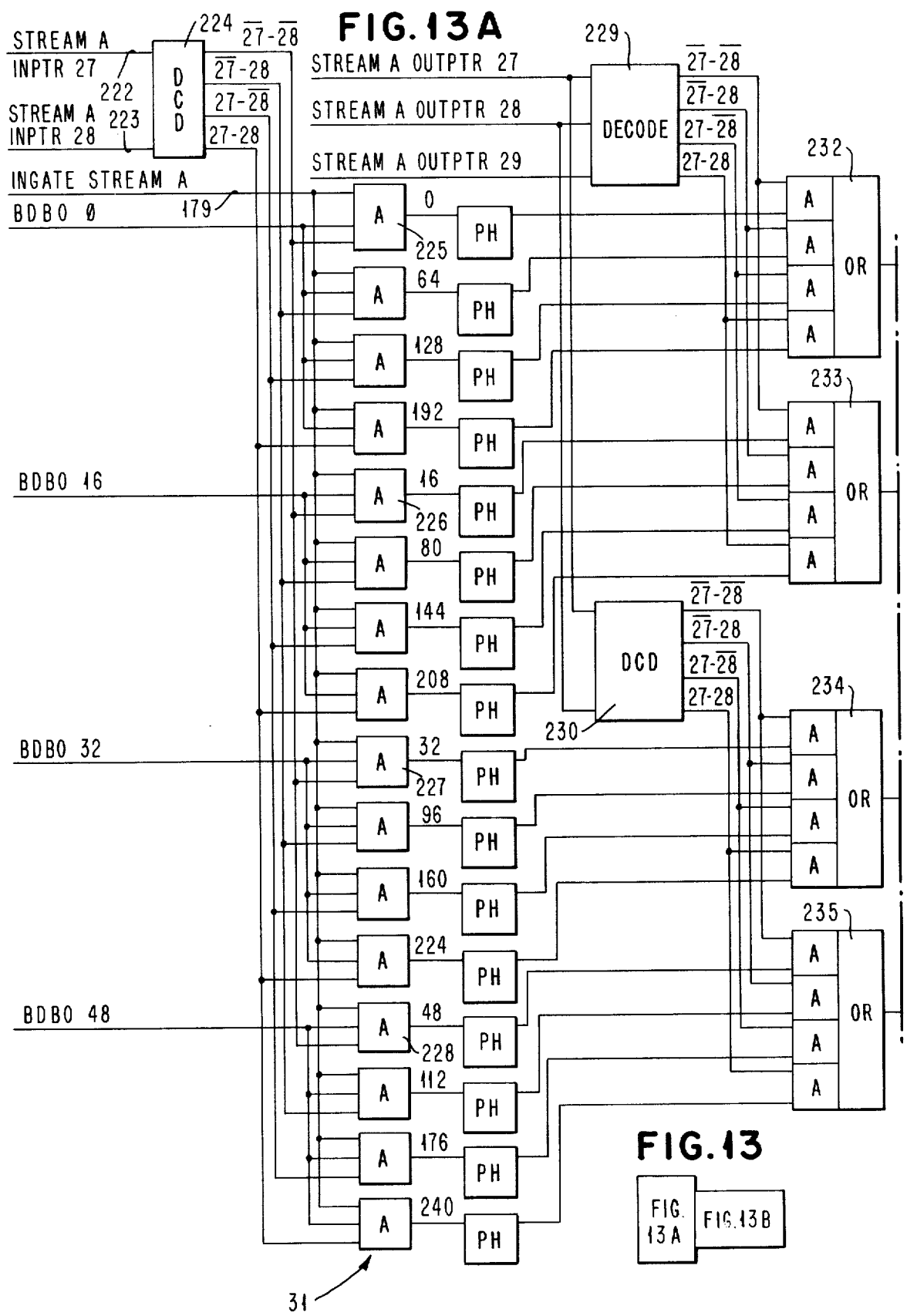

MULTI-INSTRUCTION STREAM BRANCH PROCESSING MECHANISM

BACKGROUND OF THE INVENTION

1. Field of the Invention

The present invention relates to data processing systems and more particularly to data processing systems which encounter conditional branch instructions in an instruction preprocessing unit which prefetches, predecodes, and queues multiple instructions for sequential presentation to an instruction execution unit.

2. Prior Art

The IBM System/370 Family of Computers defined by the System/370 Principles of Operations, Form No. GA22-7000, are required to execute conditional branch instructions. Conditional branch instructions specify a condition to be tested for, and the address of a new instruction to be executed if a specified condition is met. Otherwise, instruction processing continues in sequence from the conditional branch instruction. In high-performance, pipelined computers, an instruction preprocessing function (IPPF) may be used to prefetch instructions from main memory and prepare a plurality of them for sequential execution by an execution unit. When the IPPF decodes a conditional branch instruction, a preceding instruction which will establish the condition to be tested may not have been executed. It will therefore be uncertain as to whether the instruction identified by the address information of the branch instruction will in fact be executed. Some strategy must be adopted to allow the IPPF to continue prefetching of instructions from memory and predecoding of these instructions beyond the branch instruction to maintain the queue of instructions for presentation to the execution unit.

U.S. Pat. No. 3,418,638 assigned to the assignee of the present application, issued Dec. 24, 1968 to D. W. Anderson et al and entitled "Instruction Processing Unit For Program Branches" discloses the conditional branch handling mechanism of the IBM System/360 Model 90. Instructions were prefetched, predecoded and immediately transferred to a plurality of execution units whereby overlapped instruction processing and execution could be achieved. A complicated mechanism was provided for transferring conditional branch instructions to various execution units followed by further instructions which were especially marked as being conditional, and which may or may not be executed dependent upon the outcome of the conditional branch. The instruction unit contained only a single set of instruction buffers which limited the capability of the instruction unit to decode only a single conditional branch instruction and prefetch only a single target instruction stream.

U.S. Pat. No. 3,551,895 which is assigned to the assignee of the present application and which issued Dec. 29, 1970 to G. C. Driscoll, Jr., entitled "Look-Ahead Branch Detection System" discloses another high performance computer system for prefetching and predecoding instructions including conditional branch instructions. This patent discloses a requirement for a special instruction called an "Advance Branch" instruction which was utilized by an associative memory and look-ahead trees for prefetching target instruction streams when conditional branches were encountered.

Another prior, high-performance system, is the IBM System/370 Model 168 which includes an IPPF for prefetching and predecoding a plurality of instructions to be presented in sequence to an execution unit. In the System/370 Model 168-III Theory of Operations, Diagrams Manual (Vol. 2), I-Unit, Form No. SY22-6932-3, the IPPF mechanism is fully described. In this system, two separate instruction buffers are included such that prefetching and predecoding of instructions either from the instruction stream of a conditional branch instruction, or from the target instruction stream can be effected. A prediction is made during decode of conditional branch instructions as to whether or not the branch is likely to be successful or unsuccessful. Further decoding from either the original instruction stream or the target instruction stream will be effected based on this prediction, and preprocessed instructions will be buffered in a queue for sequential presentation to the execution unit. The success or failure of a condition tested will ultimately determine whether the previously decoded instructions are from the proper instruction stream. Since only two instruction buffers are provided, only the set or reset state of a trigger is required to control the proper gating of instructions to a decoding mechanism from the proper one of the two buffers.

The provision of only two instruction buffers in the System/370 Model 168, permits only a single conditonal branch instruction to be outstanding at any one time. If a second conditional branch instruction is detected in the instruction decoding mechanism, the IPPF mechanism must cease functioning until the first conditional branch is resolved, because a second target instruction stream may not be prefetched.

SUMMARY OF THE INVENTION

It is the principle object of the present invention to provide a high-performance, highly-overlapped, data processing system capable of prefetching, predecoding, and queueing multiple instructions beyond two pending conditional branch instructions.

In accordance with the present invention, the IPPF mechanism includes three separate instruction-fetching mechanisms referred to as instruction streams A, B, and C. Each instruction stream includes an instruction address register (Instruction counter) and a set of four, double-word buffers for storing prefetched instructions from storage. The prefetching of instructions into the instruction buffers and selection of one of the three instruction buffers for gating of individual instructions to an instruction decoding register is controlled by logic which keeps track of the status of each instruction stream, allocates instruction streams to target instruction streams, deallocates or resets instruction streams based on the results of conditional branch instructions, and manages a set of instruction stream pointers that control stream-related activities throughout the IPPF.

BRIEF DESCRIPTION OF THE DRAWINGS

FIGS. 3A, 3B, and 3C when arranged vertically, are a more detailed block diagram of an IPPF.

FIG. 5 shows the format of System/370 branch instructions.

FIG. 6 is a logic diagram for predicting whether the results of branch instructions will be successful or unsuccessful.

FIG. 7 is a block diagram showing the coding of branch status information from instruction decoding, and signals generated in the execution unit indicating the result of the branch testing function.

FIG. 10 is a timing diagram showing various timing relationships between a request for an instruction fetch to storage and the return of instructions for gating into instruction buffers.

FIG. 12 is a timing diagram showing the relationship of instruction decoding to instruction queueing and presentation of instructions to an execution unit in sequence.

FIGS. 13A and 13B are a logic diagram of the ingating and outgating control of one of the instruction stream buffers.

DETAILED DESCRIPTION OF INVENTION

Figure 1:
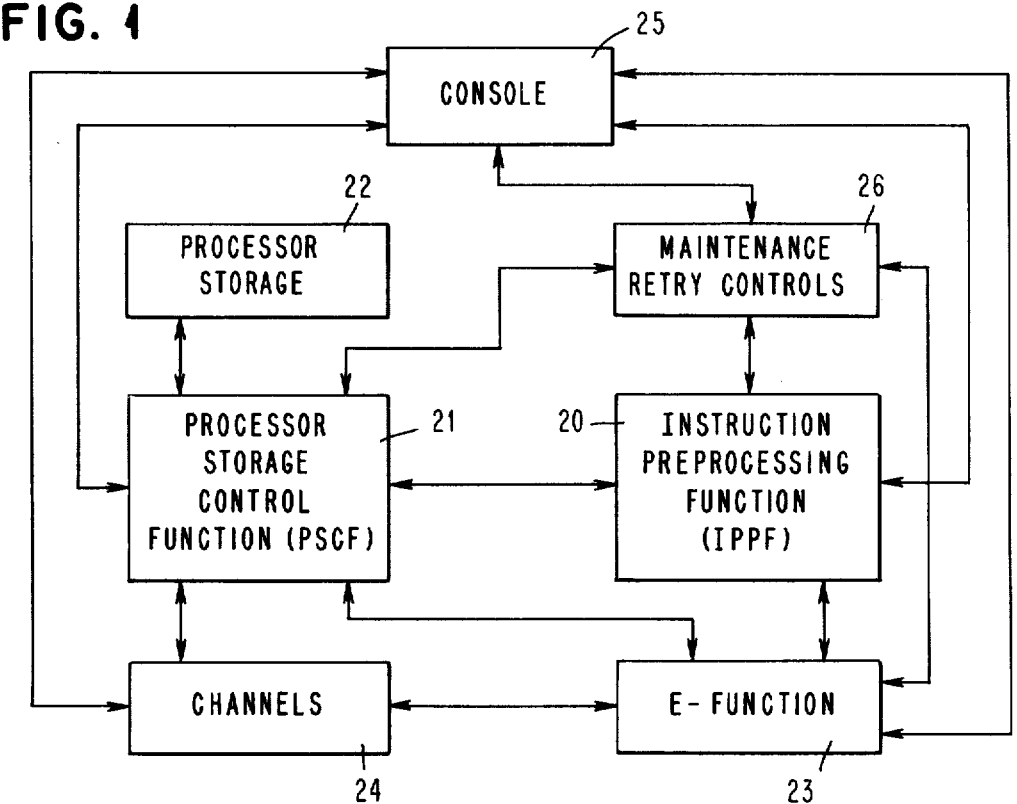
FIG. 1 is a block diagram of the major functional units of a data processing system including an instruction preprocessing function (IPPF).

FIG. 1 shows the major functional portions of a high-performance data processing system. A major portion of the present invention is found in an Instruction Preprocessing Function (IPPF) 20. The IPPF 20 communicates with a Processor Storage Control Function (PSCF) 21, which includes a high speed buffer or cache, to obtain sequences of instructions from Processor Storage 22, and initiate the transfer of data operands to an execution unit or E-Function unit 23. The IPPF 20 also communicates with the E-Function 23 to transfer instructions one at a time, in sequence, to the E-Function 23. Results of instruction executions in the E-Function 23 will be communicated back to the IPPF 20 to provide control to dictate the sequence of instruction execution.

Remaining portions of a data processing system, not pertinent to an understanding of the present invention, include Channels 24, a Console 25, and Maintenance and Retry Controls 26.

Figure 2:
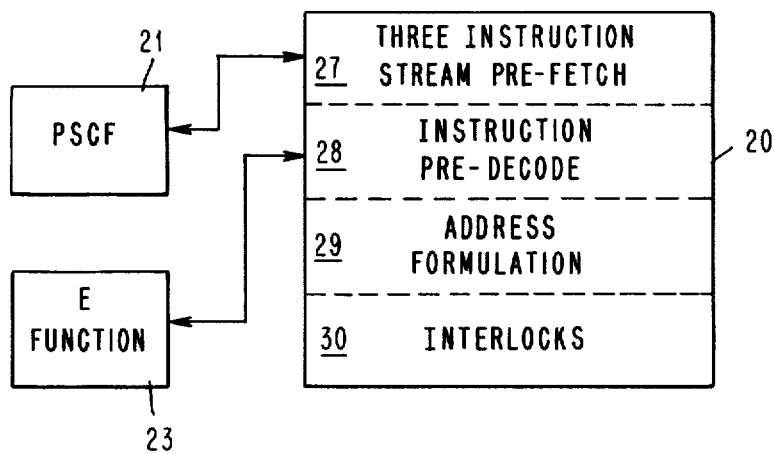
FIG. 2 is a block diagram showing the major functional units of an IPPF.

FIG. 2 depicts four major functional areas within the IPPF 20 of FIG. 1. These include three instruction stream prefetch logic 27, instruction predecode 28, address formulation 29, and an interlock mechanism 30. The IPPF 20 will be shown to have the ability to store, or queue, four predecoded instructions for presentation in sequence, one at a time, to the E-function 23. This includes information as to data operands to be fetched, general purpose registers to be utilized, starting address information for a microprogram controlled control store, and various other control signals to be more fully described. A great number of the instructions to be decoded require address arithmetic to be accomplished in the IPPF 20 and therefore address formulation logic 29 is provided. A number of interlocks 30 are required to insure that proper data for use in address formulation and instruction predecoding is available prior to entry of decoded instruction information into the four-position queue.

It is a major function of the present invention to control the logic and gating circuitry of the three instruction stream prefetch mechanism 27. This mechanism includes three separate instruction buffers, each capable of storing a plurality of instructions from three separate instruction streams to be utlized, one at a time, in the instruction predecode mechanism 28. It is the control of the three separate instruction buffers in response to encountering conditional branch instructions which gives rise to the present invention.

Figure 3C:
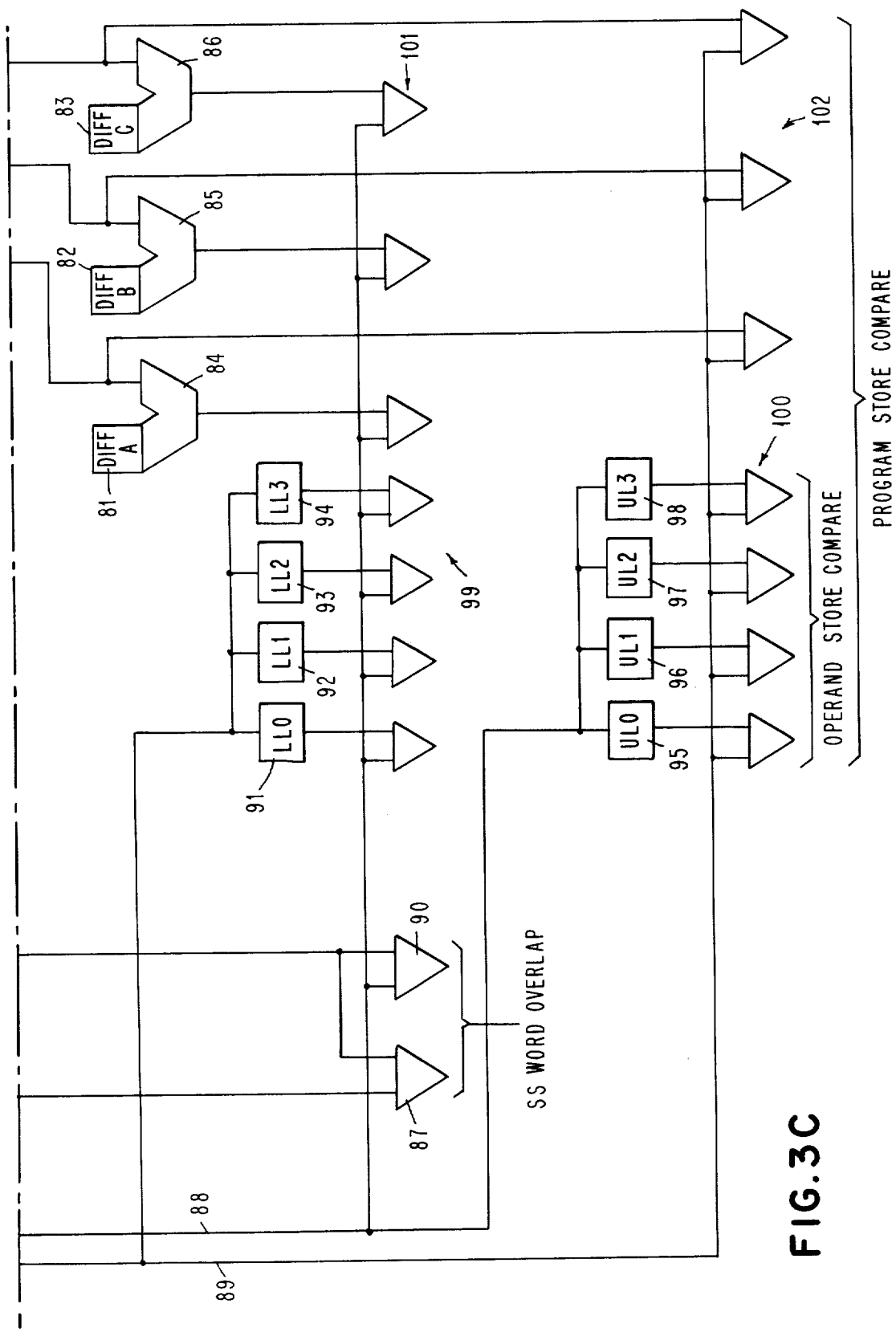

When FIGS. 3A, 3B, and 3C are arranged vertically, more detail of the IPPF 20 is shown. In block diagram form, FIG. 3A comprises the instruction fetching and decoding logic. FIG. 3B comprises the address arithmetic logic, and FIG. 3C shows some of the interlock mechanism associated with the IPPF 20.

In FIG. 3A, three separate sets of instruction buffer registers, noted generally at 31, 32, and 33, are shown. Each set of instruction buffer registers, noting the set labeled I-Buffer A in particular, when selected, will receive 64 bits of instruction information each time an instruction fetch request is transmitted to the PSCF 21. Depending on the instruction address counter value associated with a particular set of instruction buffers, the 64 bits of instruction information will be gated into a particular one of the four registers shown. Therefore, 32 eight-bit bytes of instruction information can be prefetched and stored in each of the sets of instruction buffers 31, 32 or 33.

In the disclosed system, instructions will be decoded one at a time in the IPPF 20. The particular instruction to be decoded in the proper sequence will be transferred to an I-Register 35 which will contain 32 bits of instruction information. A set of gates noted generally at 36 will be energized in accordance with instruction counter address information to transfer the proper one of a plurality of instructions from the one of the instruction buffers currently being utilized during instruction execution to the I-Register 35 for subsequent decoding. The set of gates 36 shown are necessary to accommodate the fact that in the IBM System/360 and System/370 architecture, instructions can be of varying lengths, including two 8-bit bytes, to four or more bytes. Various gate combinations will be enabled to insure that for each instruction to be decoded, the 8-bits of the operation code will be placed in bits 0–7 of the I-Register 35. Depending on the format of the particular instruction being decoded from I-Register 35, bits 8–15 may be mask bits, coded information concerning the length of variable field operands, or addresses of General Purpose Registers. Bits 12–15 and 16–19 may designate particular ones of sixteen general purpose registers in accordance with address formulation in the System/360 and System/370 architecture. Bits 20–31, of four byte instructions, are a displacement field entering into the generation of address information for accessing data operands from storage.

The instruction decoding mechanism of the IPPF 20 includes hardware decode 37, array decode 38, and Control Store Address Register (CSAR) decode 39. The decoding of each instruction in I-Register 35 requires two clock cycles within the system. During the first clock cycle, certain information concerning the instruction being decoded must be available as quickly as possible and this information is provided through the hardware decode 37. Not until the second cycle of each instruction decode is certain other information required and this information is obtained from the array decode 38 where the OP-code bits 0–7 are used to address the random access array to provide a plurality of control signal lines 40 and another plurality of control signal lines 41.

The results of the instruction decoding function just discussed are stored as instruction execution control information in one of four registers of an Instruction Queue 42. Part of the execution control information is received on a line 43 which is the 8-bits of the OP code indicating the basic function to be performed by the E-function unit. In many known microprogrammed control systems, in which a control storage device contains microprograms, the eight OP code bits would be utilized to address the first micro instruction of a sequence of micro instructions to effect execution of the instruction. To enhance the performance of the microprogram control system, additional binary bits utilized for the first cycle of access to the control store are provided on line 44 which have been developed from the CSAR decode 39 which responds to mask information contained in bits 8-15 of the instruction being decoded, and the control signal lines 41 obtained from the array decode 38. Additional execution control information is obtained from the array decode 38 on line 40. Further, line 45 represents operand address information obtained from the address formulation mechanism to be discussed in connection with FIG. 3B. The execution control information from one of the four registers of the Instruction Queue 42 will be transferred to the E-Function 23 for each execution.

The prefetching of instructions in a particular instruction sequence A, B, or C, into a particular one of the instruction buffers 31-33, continues in parallel with the presentation of a single instruction to the I-Register 35, and presentation of execution control information to an empty one of the four registers of the Instruction Queue 42. A signal from the E-Function 23, indicating completion of an instruction execution by the E-Function 23, will be the signal which gates the next execution control information, in sequence, from one of the four registers of the Instruction Queue 42 to the E-Function for execution. As long as an empty register in the Instruction Queue 42 is available, instruction decoding and entry of execution control information into the empty Queue 42 can proceed.

In addition to the fact that all four registers of the Instruction Queue 42 are full, indicating instruction decoding should be suspended, certain other machine conditions, broadly classified as interlocks, to be more fully discussed, may suspend instruction decoding. Part of the instruction decoding process is the formulation of storage addresses from combinations of address bits contained in each instruction, and the data content of instruction addressable general purpose registers in accordance with the IBM System/360 and System/370 architecture. An interlock, preventing or suspending instruction decode, would be energized if an instruction contained in the Queue 42 has not been executed, and this instruction is to load information into a general purpose register to be utilized for forming an address of an instruction presently contained in the I-Register 35. In this situation, decoding of the instruction in I-Register 35 must be suspended until the information is available from the unexecuted instruction.

The IBM System/360 and System/370 architectures specify instruction addressable general purpose registers. These are normally physically contained and utilized in an execution unit, and such is the case in the system being discussed. However, to speed up address arithmetic, a second copy of the 16 general purpose registers is contained in the IPPF 20. These are shown at 46. The normal path, to be discussed, for entering information into the general registers 46, is through a working register labeled C-reg. in the E-Function 23, and would be entered into the general registers 46 on a line 47. Lines 48 and 49 receive general register address information from the I-Register 35. The outputs of the general register 46 are applied to the address arithmetic mechanism of FIG. 3B to be discussed, along with displacement address bits 20-31 from I-Register 35 along lines labeled 52.

In FIG. 3B, most of the address formulation hardware of the IPPF 20 is shown. An address adder 53 receives the displacement bits 20-31 on line 52 and the output of general registers 46 on lines 50 and 51 to provide the IBM System/360 and System/370 architected storage address information which is a summation of twelve displacement address bits 20-31 (D2), twenty-four address bits representing a base value (B2), and 24 bits of index information (X2).

Another input to the address adder 53 is from a line 54 which originates from a bypass mechanism 55 in FIG. 3A. The bypass mechanism 55 is utilized to recognize those interlock situations in which the instruction contained in I-Register 35 requires data from a general register 46 which has not yet received this data from storage in response to a previously decoded instruction. When the data is returned from storage in response to the previously decoded instruction, bit positions 40-63 on the buffer data bus 34 will be diverted by the bypass mechanism 55 to the proper input of the address adder 53 at the same time the data is being returned, in the normal fashion, to the general registers in the E-Function 23, and through the C register into the general registers 46 on line 47. This mechanism permits the resumption of instruction decoding of the instruction in I-Register 35 at least one cycle earlier than if the bypass mechanism 55 were not present.

FIG. 3B shows additional address formulation logic referred to generally at 29 in FIG. 2. A length incrementer 56 has two inputs, one of twenty-four bits and another of eight bits, and an output of twenty-four bits. The twenty-four bit input is from a group of triggers designated as the Process Address Register (PRAR) 57, and the 8 bit input is from a group of triggers designated as the Length Register (LR) 58. The twenty-four bit output feeds a group of latches designated as the Process Adder Latches (PRAL) 59, Address Incrementer Latches 60, and various compare circuits to be further identified. The input to PRAR 57 is from PRAL 59 which can be initialized from the Address Adder 53, an Address Incrementer 61, or a bus 62 from the E-Function 23. The input to LR 58 is from Length Logic 63 of FIGURE 3A via length latches (LL) 64, and is a result of the needs of variable field length operand instructions being decoded.

A further set of latches 65 are shown at the output of the Address Adder 53. The address information in PRAL 59 is transferred to the PSCF 21 on a bus 66 for accessing storage. The output of the incrementer latch register 60 is presented to the E-Function 23 on a bus 67 to a working register identified as a C Register. The address information transferred on bus 67 to the E-Function 23 is for the purpose of providing address information to the E-Function 23, when the E-Function 23 is required to send address information to the PSCF 21.

A number of 24 bit address registers are shown in FIG. 3B. These registers are provided address information from the output of the Address Adder latch 65, or address incrementer latches 60, and all provide outputs back to the address incrementer 61 on a bus 68. The Translation Exception Address register (TEA) 69 is utilized during a system state of a virtual memory system wherein, prior to access requests to storage, where address translations may not have previously been done, a trial search for an address translation can be attempted. The TEA register 69 holds the logical address associated with an access exception detected during preprocessing of an instruction in I-Register 35, but has meaning only when operating in the trial mode. The register 69 can be set from the Address Adder latches 65, or the incrementer latches 60.

A Source Address register (SRC) 70 and a Destination address register (DST) 71 each consist of 24 bits. Registers 70 and 71 are used primarily for holding source and destination fetch addresses in accordance with the source and destinations utilized in IBM System/360 and System/370. The registers 70 and 71 can be initialized from the Address Adder latches 65 for IPPF 20 generated requests, and from the bus 62 via the incrementer latches 60 for E-Function 23 generated requests. The registers 70 and 71 can be incremented or decremented via the incrementer 61 and their contents can be made available to the E-Function 23 on bus 67.

Twenty-four bit address registers 72 through 77, designated OAA through OAF, are each associated, on a one to one basis, with six operand buffers located in the E-Function 23. An operand address register/operand buffer pair, along with their associated controls are capable of fetching a single double word from the PSCF 21 and holding it. The address incrementer 61 is available to the operand fetching mechanism. Any one of the operand address registers 72 through 77 may be gated to the Address Incrementer 61 and have 0 or 8 added to it, and the Incrementer 61 output may be gated back to any of the operand address registers 72 through 77. There are two fetching mechanisms in the IPPF 20 which share the register 72 through 77. One is known as the destination fetching mechanism and the other is known as the source fetching mechanism. When both mechanisms are active, each is allowed to use three operand address registers. When only the source mechanism is active, on certain instructions, it may use all available operand address registers.

The remaining twenty-four bit address registers 78, 79, and 80, labeled IAA, IAB, and IAC, respectively, are each associated with the sets of instruction buffers 31, 32, and 33 respectively, and represent Instruction Counters. The contents of the active instruction address register 78, 79, or 80, which is being utilized to fetch instructions from the PSCF 21 on bus 35 of FIG. 3A, is incremented by eight between fetches under control of its sequencer. The content can also be decremented by 8 or 16 in the Address Incrementer 61 in the event that the PSCF 21 rejects a request or requests, and the address must be recreated.

Continuing with the discussion of instruction accessing and the manipulation of address information in instruction address registers 78 through 80, FIG. 3C shows a difference register 81, 82, and 83 associated with each of the instruction address registers 78 through 80. Each difference register 81 through 83 consists of five bits, and contain the value which must be subtracted from its associated address registers 78 79, or 80 to obtain the instruction counter value of the associated instruction stream A, B, or C in the I buffers 31 through 33 in FIG. 3A. When an instruction address registers 78, 79 or 80 is initiated with a new value, the associated difference register 81, 82, or 83 is set to 0. Thereafter, the difference register of the active I-stream A, B, or C is subject to an update on each cycle. If the associated instruction address register is incremented or decremented, the difference register 81, 82, or 83 is updated by an associated adder 84, 85, or 86 by an equal amount. The amount may be plus 8, minus 8, or minus 16. During the first cycle of execution from its associated instruction stream A, B, or C, the difference register 81, 82 or 83 is decremented by a value equal to the length of the instruction transferred to the instruction register 35 of FIG. 3A. The value may be minus 2, minus 4, or minus 6. If the instruction being gated to the E-Function 23 from the instruction queue 42 of FIG. 3A is a System/360 or 370 Branch and Link instruction, the difference register 81 through 83 associated with the instruction stream 31 through 33 from which the branch and link instruction has been obtained, is decremented by an additional value equal to the length of the instruction. When it is necessary to calculate the instruction counter value for a particular one of the instruction streams 31 through 33, the associated difference register 81 through 83 is subtracted from the associated instruction address register 78 through 80 in the Address Incrementer 61.

The remaining block diagram of FIG. 3C relates to certain interlocks noted generally at 30 in FIG. 2. A number of compare circuits, one of which is noted at 87, detect various equality conditions between the address information on line 88 from the Length Incrementer 56 of FIG. 3B, and address information on a line 89 from the PRAR 57 of FIG. 3B. The IBM System/360 or 370 architecture includes an instruction format called SS, wherein two operands from storage, each of which have a variable length are designated. A companion comparator 90 to that of 87 will detect a condition which must be recognized known as SS Word Overlap. This condition, indicates that the source and destination operands have fields which overlap each other destructively.

Another situation which must be recognized, and processed, is a situation where an instruction which is executing or awaiting execution in the instruction Queue 42 of FIG. 3A, is going to change an operand in storage, and a subsequent instruction decodes a need for fetching the same operand from the same location. In this situation, the data for the later instruction must not be fetched until after the data from the earlier one is stored. System/370 architecture requires that this Operand Store Compare condition be detected even in situations where the two references to the location are made using different virtual addresses. To accomplish this, the circuits detecting Operand Store Compare will ignore bits 8 through 20. This will result in some compares being detected which are not real. To detect the Operand Store Compare condition, each register position of the Instruction Queue 42 has two addresses associated with it which contain the beginning and ending addresses (modulo 2K) of the storage field which the instruction modifies.

The lower limit address is the logical address from the instruction, and the upper limit address is generated in the Length Incrementer 56 of FIG. 3B. There is also a bit associated with each register of the Instruction Queue 42 indicating that the instruction is to alter storage. The lower limit (LL) address information for each instruction queue register (0–3) is placed in an associated register 91 through 94, and the upper limit (UL) address information is placed in an associated register 95 through 98. As operand address information is created in the Length Incrementer 56, it is indicated on busses 88 and 89. Compare circuits, shown generally at 99 and 100, detect the situation in which an instruction being decoded in I-Register 35 must be delayed until a previous store is executed.

Another interlock situation is noted by compare circuits noted generally at 101 and 102, which will detect a situation where an instruction fetched from storage has the same address indicated on bus 88 or 89 for an instruction being decoded which will store data into the same location as the prefetched instruction.

Figure 4:
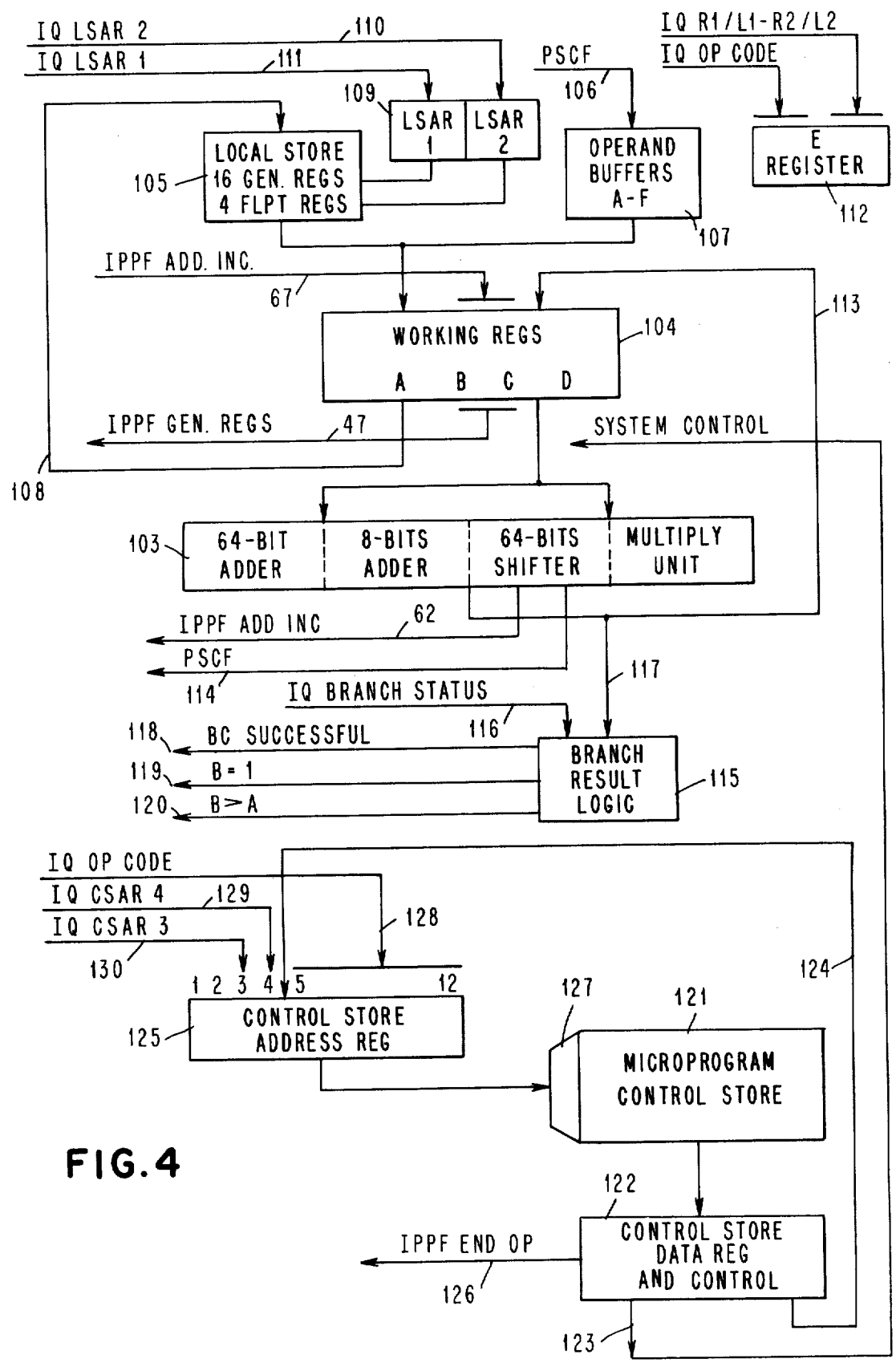
FIG. 4 is a block diagram of an execution unit showing those portions responding to, and signalling the result of, conditional branch instructions.

FIG. 4 shows a block diagram of some of the major registers and data paths within the E-Function 23 of FIG. 2. The major unit of the E-Function is an Arithmetic and Logic Unit (ALU) 103 which consists of a 64 bit adder, an 8-bit adder, 64 bit shifter, and a multiply unit. Data to the ALU 103 will be applied from a set of working registers 104 labeled A, B, C and D. The working registers 104 are not addressable by programmed instructions, but are accessed through execution sequencing. A local store 105 is included in the E-Function, and this is comprised of 16 general purpose registers and four floating point registers as specified in the architecture of IBM System/360 and 370, and are addressable by information in program instructions. When data is to be entered into one of the local store registers 105 from main storage, the data will be received from the PSCF 21 on a bus 106. The data is entered into one of six operand buffers 107 labeled A through F. Operand buffers A through F have been previously referred to in connection with the associated operand address registers 72 through 77 in FIG. 3B. The data received on bus 106 will be transferred through one of the working registers 104, and then over a bus 108 to the addressed local store register 105. The address of the local store register 105 to be manipulated during an instruction execution is entered into local store address registers 109 which receive the address information in turn over a bus 110 and 111, as part of execution control information transferred from the Instruction Queue 42 of FIG. 3A. As mentioned earlier, a set of addressable general purpose registers 46 is shown in FIG. 3A and the bus 47 is shown whereby data being stored into an addressed local store register 105 will also be transferred through the C working register to the identical register in the IPPF general register 46.

Other execution control information transferred from the Instruction Queue 42 is entered into an E register 112. This information includes the 8-bit OP code of the instruction to be executed, and the subsequent 8 bits of instruction information which may be either addresses of general purpose registers 105, or length information for variable field length operands.

All data to be utilized in the ALU 103 may come from two registers of the local store 105 through working registers 104, one operand from local store 105 and another operand from an operand buffer 107, or intermediate results from the ALU stored into a working register on a bus 113. Data to be stored in main store from the E-Function will be on a bus 114 at the output of the 64 bit shifter. As also shown, bus 62 from the output of the 64 bit shifter is the input provided to the address incrementer latch 60 of FIG. 3B.

In discussing the present invention, reference will be made to branch status, and branch results. Shown in block diagram form is branch result logic 115 which receives, as part of the execution control information from the Instruction Queue 42, branch status information on lines labeled 116. The branch status signals on line 116 indicating a particular kind of branch instruction being executed, will be logically combined with results from the ALU 103 on a line 117 to signal back to the IPPF 20 the results of data manipulations which determine the success, or not, of conditional branch instructions. Three signals returned to the IPPF to control the proper sequencing of instruction execution in response to branch instructions are provided on lines 118, 119, and 120. Line 118 labeled BC Successful will indicate whether or not a branch on condition instruction has been successful. The branch on condition instruction in IBM System/360 and 370 is an instruction which samples for a particular condition code setting to determine whether or not a target instruction of a branch instruction should be accessed. Line 119 labeled B=1 will signal the results of a branch instruction which looks for a value of zero in the B working register. Line 120 labeled B>A, will signal that the contents of B working register are greater than the contents of the A working register. Details for the generation of the branch status signals 116 and use of the branch results on lines 118, 119 and 120 will be more thoroughly described.

The basic sequence control for any instruction execution is by means of microprograms, or microinstruction sequences from a control store 121. Each microinstruction read from the control store 121 will be entered into a Control Store Data Register 122. The decoding of various fields within a microinstruction in register 122 will create a number of control lines labeled 123 for energizing and sequencing all the gating of information within the E-Function 23. Another set of lines, labeled 124, include address information to be utilized in the Control Store Address Register (CSAR) 125, and control sequence of microinstructions read from the control store 121.

At the completion of execution of any particular instruction received from the IPPF, the control store data register and control 122 will issue a signal to the IPPF 20 on a line labeled 126 and called IPPF END OP. In response to the signal on line 126, the next execution control information stored in the Instruction Queue 42 of FIG. 3A will be transferred to the E-Function. The starting microinstruction to be obtained from the control store 121 is addressed by a decoder 127 based on ten address bits inserted into the control store address register 125 from the Instruction Queue 42. The ten address bits are obtained as a result of transferring on lines 128, the eight-bits of the OP code to be executed. In addition, bits three and four of the initial address in address register 125 are obtained from the previously mentioned CSAR decode 39 of FIG. 3A, and these bits are received on lines 129 and 130.

FIG. 5 shows various conditional branch instructions utilized in IBM System/360 and 370. There are four basic instructions called Branch on Condition, Branch on Count, Branch on Index Low/Equal or High, and Branch and Link. Most of these are included in two different formats, such as Branch on Condition in which the target address, if the branch is to be taken, is contained in a general purpose register identified by four bits designated R2. In the other format, the address of the instruction to branch to, or the target instruction, will be specified by the address formulation achieved by adding together the contents of base register B2, index register X2, and the displacement field D2 of the instruction. In both formats, four bits labeled M1, specify a mask which indicates the particular condition code setting to cause a branch. If the condition code setting is as specified by the code designated by the mask M1, the branch will be successful. When the condition code setting does match the mask M1, the signal BC Successful on line 118 of FIG. 4 will be received by the IPPF 20. In the Branch on Count instruction, the content of the general purpose register specified by R1 is algebraically reduced by 1. When the result is 0, normal instruction sequencing proceeds with the next instruction in sequence. When the result is not 0, the next instruction executed will be accessed from the target instruction address. The results of the incrementing of the register specified by R1 will be manifested in the B working register and signalled on line 119 labeled B−1.

There are two Branch and Index instructions labeled Branch on Index High, and Branch on Index Low or Equal. In these instructions, an increment is added to the operand specified by R1, and the sum is compared algebracally with a comparand. Subsequently, the sum is placed in the first operand location regardless of whether the branch is taken. In the Branch on Index High, when the sum is high, the instruction address is replaced by the target instruction address. In the Branch on Index Low or Equal, when the sum is low or equal, the instruction address is replaced by the target instruction address. The results of the comparison called for are indicated on line 120, labeled B>A.

In the Branch and Link instruction, the instruction counter value is stored as link information in the general purpose register specified by R1. Subsequently, the next instruction is taken from the target instruction address information. This instruction becomes conditional as a result of the ability of a programmer to insert 0 in the R2 field of the BALR instruction. In this case, the link information will be stored in the register designated by R1, but branching to the target address will not take place.

When utilizing conditional branch instructions, of IBM System/360 or 370, the instructions are utilized in such a way that a guess can be made whether the branch condition will exist, and that the target instruction will be executed next. Further, a programmer can insert certain bit patterns in the instruction fields having mask bits, or specify a general purpose register of 0, to cause the branch instruction to always be successful or never successful.

FIG. 6 shows the logic by which the predictions are made with regard to the success or failure of detecting a particular branch condition. An OR circuit 131 will provide an indication on line 132 indicating that the branch will probably be successful. OR circuit 133 will provide a signal on line 134 where the coding is such that it is known that the branch is successful, and that the target instruction address will be utilized. OR circuit 135 will provide a signal on line 136 in those situations where the programmer has inserted certain information in the instruction fields which will invariably cause the next instruction in sequence after the branch instruction to be executed. As shown at OR circuit 131, when either of the Branch or Index instructions is decoded, it is assumed the branch will be successful and therefore the target instruction should be the next instruction executed. If the results signalled on line 119, as to the contents of the B register, are not as expected, then corrective action must be taken. This will be discussed subsequently.

The Branch on Count instruction is also assumed to create the need for the target instruction. In the case of the Branch and Link instruction (BAL), this should be guessed as successful and in fact is utilized at OR circuit 133 to indicate that it is known that the target instruction should be obtained and executed next. As indicated previously, however, if the programmer has inserted 0 in the R2 field of the BALR instruction, the link information will be stored, but a branch will not be taken. AND circuit 137 in FIG. 6 indicates this situation, and provides an input to OR circuit 135 indicating that a branch is not to be taken. AND circuit 138 detects the BALR instruction with the R2 field not equal to 0, and provides an output to OR circuit 131 and OR circuit 133 indicating that it is a known successful branch instruction.

AND circuits 139 and 140 examine fields of the Branch on Condition (BC) instruction to determine whether or not the mask field is all ones or all zeros. An output from AND circuit 139 provides an output from OR circuit 133 indicating a situation where a branch will always be successful. AND circuit 140, which detects that the mask field is all zeros, indicates the situation where the programmer has chosen not to cause a branch with this instruction in any situation, and therefore OR circuit 135 will indicate that this is a no branch situation. AND circuits 141, and 142, and OR circuit 143, examine fields of the Branch on Condition instruction (BCR). A mask field of all ones or all zeros, and zero or non-zero values of field R2, will indicate those situations where there will not be a branch ever, the branch is known to be successful, or a guess successful condition is indicated, and must await actual execution of the instruction to determine whether or not the guess was proper.

AND circuits 144 and 145 examine the fields of the Branch on Count instruction BCTR. If the R2 field equals 0, it is considered not to be a branch, and if the R2 field is not zero, OR circuit 131 will indicate that this is a branch that will probably be successful.

FIG. 7 represents the coding of branch status signals inserted in three bit positions of any of the four registers of the Instruction Queue 42. A table 146 shows the coding of the bits 147, 148 and 149 which will be inserted in the branch status bits of each register of the Instruction Queue 42 in accordance with the type of instruction to be executed. For example, the branch status bits will be coded "000" when the instruction queue register does not contain an instruction, or the instruction inserted is to be considered a no-branch instruction, including branch instructions in which the logic of FIG. 6 has determined that it is not to be considered a branch instruction. The coding "010" will be inserted in the Branch status bits of the instruction queue register which contains a Branch on Condition instruction. Coding "011" will be inserted whenever OR circuit 133 of FIG. 6 provides an output. The remaining code combinations show the indications for various other conditional branch instructions.

The block 150, labeled Branch Result Decode contains logic, to be described, which combines the branch status information on lines 147, 148, and 149 contained in the branch status bits of the instruction queue register of a branch instruction, with execution result signals from the E-Function 23 on lines 118, 119 or 120, after completing execution of the associated conditional branch instruction.

The branch status information, instruction execution results signalled from the E-Function, and the binary state of line 132 in FIG. 6, indicating that a guess successful or guess unsuccessful has been made, provides information to the IPPF 20 which insures that the next instruction transferred from the Instruction Queue 42 to the E-Function 23 is from the proper one of three instruction streams. That is, either the next instruction in sequence after the branch instruction, or the target instruction which has been fetched utilizing the address information in the conditional branch instruction will be transferred. The outputs from the Branch Result Decode 150 include signals indicating that the branch was successful, and that the guess was right or wrong, or the branch condition was found to be unsuccessful, and the guess was right or wrong. These various conditions are indicated on signal lines numbered 151 through 154 respectively.

Figure 8:
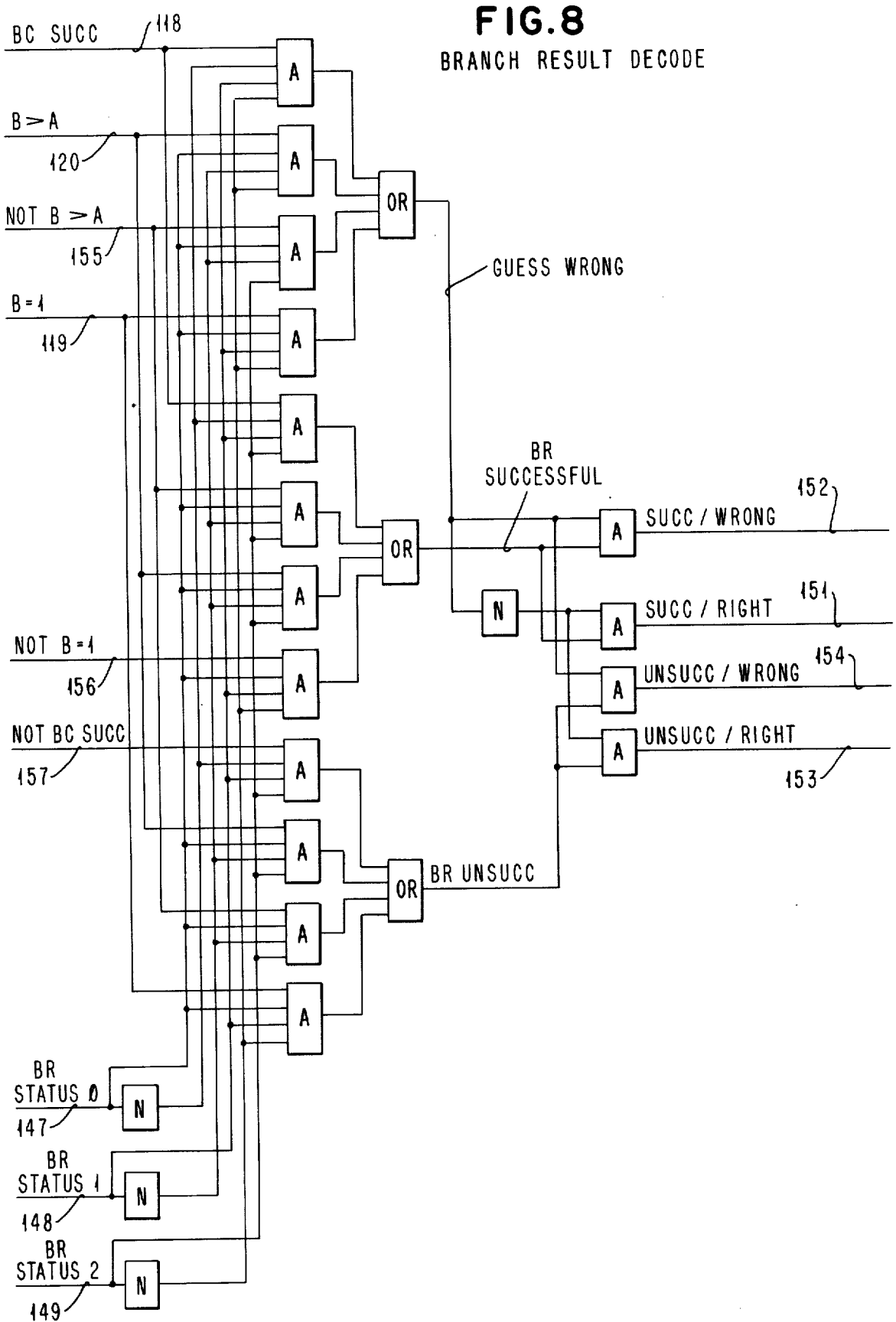
FIG. 8 is a more detailed logic diagram of the branch result decoding shown in FIG. 7.

FIG. 8 shows detailed logic of the Branch Result Decode 150 of FIG. 7. The branch execution result signals 118, 119, and 120 are shown, as are the branch status bits on lines 147, 148 and 149. The signals on lines 155, 156, and 157 are the inverted binary value of the signals on lines 118, 119, and 120. The detailed logic combines all of these various signals, and provides the output signal lines 151 through 154 indicating whether the branch was successful or unsuccessful and whether or not the original assumption was right or wrong.

Returning now to a discussion of FIG. 3A, reference will be made to the general problem encountered when conditional branch instructions must be executed. Each of the set of registers which make up the three Instruction Buffers 31, 32, and 33 have a number of input gates and output gates, such as shown at 36. Each also have a set of hardware triggers and logic which respond to the empty or full status of the registers, and the present value of the associated Instruction Address register 78, 79, and 80. These hardware sequencers coordinate instruction fetch requests to the PSCF 21 for associated instruction streams A, B, and C, and coordinate the transfer of variable length instructions from the proper instruction buffer register to the I-register 35. An Active trigger and a Busy trigger is also associated with each of the Instruction Buffers 31 through 33. When a conditional branch instruction is decoded in I-register 35, an instruction buffer which is not active or busy will be identified and made active and busy, and the associated hardware triggers and logic will be activated to make an instruction fetch request to the PSCF 22. When the target instruction of the conditional branch is returned on the data bus 34, it will be gated into the instruction buffer that has been activated.

At the time the execution control information of the conditional branch instruction in I-register 35 is transferred to the Instruction Queue 42, a guess will have been made in accordance with the logic shown in FIG. 6, as to whether or not the conditional branch will be successful or unsuccessful. Based on this guess the next instruction to be transferred to the I-register 35 will either be from the instruction buffer containing the conditional branch instruction, or from the instruction buffer which has received the target instruction stream. Instruction decoding will then continue, and execution control information transferred to the Instruction Queue 42. If a second conditional branch instruction is decoded, and one of the Instruction Buffers 31, 32 or 33 is not active, a third instruction fetch for a third instruction stream may be initiated, and the same determination as to the success of the conditional branch instruction made.

As execution result signals for conditional branch instructions are returned to the IPPF 20 from the E-function 23, and compared with the branch status information contained in the Instruction Queue 42, in accordance with the showing in FIG. 8, adjustments may have to be made for having made a wrong guess as to the success of the conditional branch instruction. If the original guess as to the success of the conditional branch was correct, instruction decoding and execution will proceed in accordance with that guess. If the original guess was wrong, the execution control information contained in the Instruction Queue 42 from subsequently decoded instructions will be destroyed, and the next instruction from the proper instruction stream will be transferred to the I-register 35 for decoding.

Figure 9:
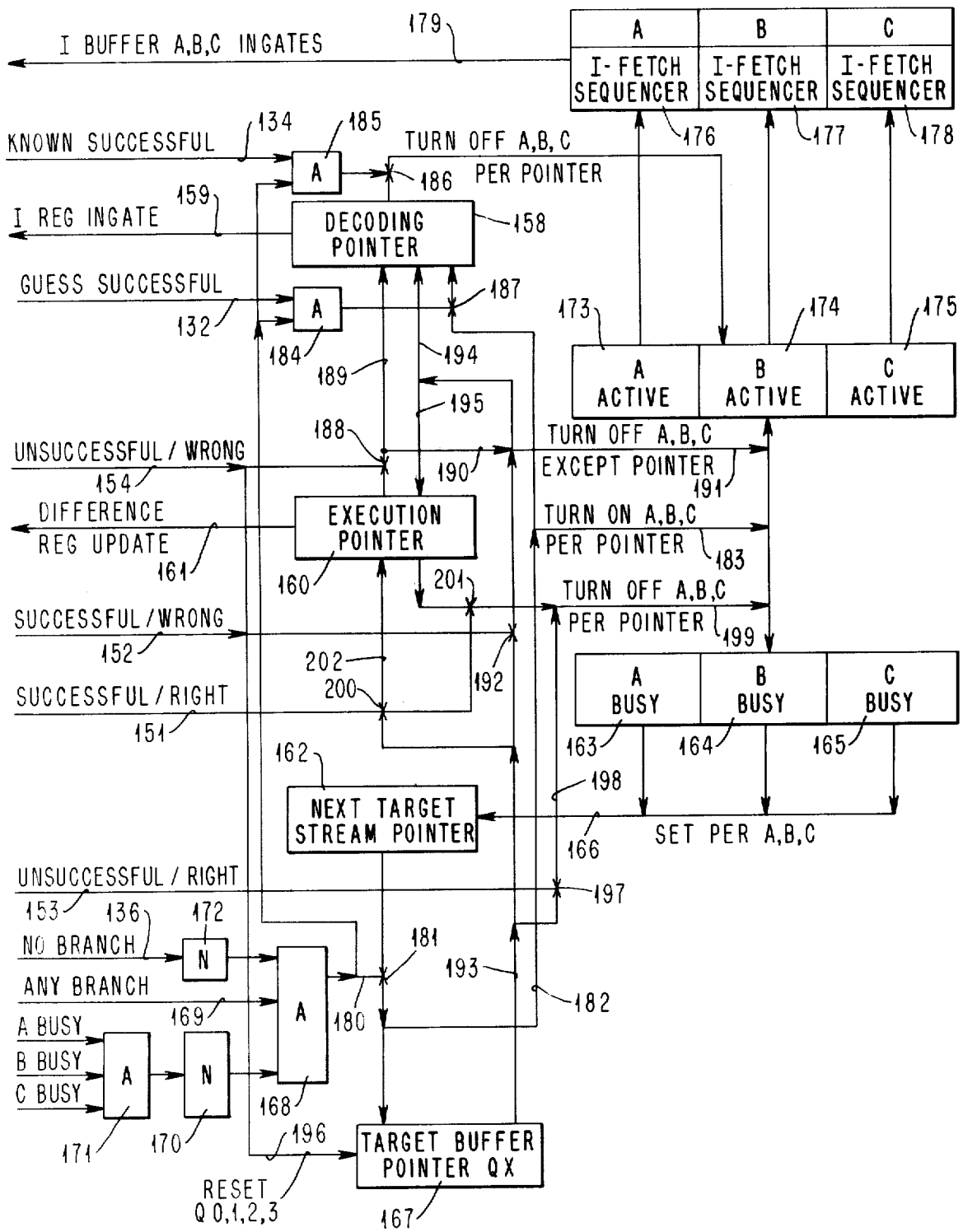
FIG. 9 is a block diagram showing pointers utilized for controlling the ingating and outgating of three instruction stream buffers.

FIG. 9 shows the logic for responding to the original guess, as to the success of a conditional branch instruction, and the return of execution result signals, for thereafter insuring that execution control information is transferred to the E-function in the proper sequence. The coordination of the proper sequence of instruction execution control information transferred to the E-function 23 from the Instruction Queue 42 of the IPPF 20, is by means of four pointers, each of which is comprised of two binary triggers. The decoding of the pointers identify a particular one of the Instruction Buffers 31, 32 or 33 which are associated with instruction streams A, B, or C respectively.

The two-bit pointers include a Decoding Pointer 158 which will energize signals on a line 159 to the I-register In-gates 36 associated with the instruction buffer from which instructions are being transferred to the I-register 35.

The Execution Pointer 160 identifies the instruction stream A, B, or C which is the source of the instruction execution control information which was last transferred to the E-function 23. The decoding of this information will be utilized to enable the associated difference register 81, 82, or 83 shown in FIG. 3C, and this is accomplished over a line labeled 161 and called Difference Register Update.

The Next Target Stream Pointer 162 responds to the setting of Busy triggers 163, 164 and 165 associated with each of the instruction streams A, B and C, to identify a particular one of the Instruction Buffers 31, 32 or 33 which is to be activated to receive the target instructions identified by a conditional branch instruction. Depending on the success of conditional branch instructions, the instruction buffers will be made busy and not busy in various sequences, and therefore the set and reset state of Busy triggers 163 through 165 will be decoded, and a line 166 will be effective to control the state of the next target stream pointer 162.

A fourth pointer 167, labeled Target Buffer Pointer is part of the execution control information placed in each of the registers of the Instruction Queue 42. When a conditional branch instruction has been decoded, and the execution control information transferred to the Instruction Queue 42, the identity of the instruction buffer which is to receive the target instruction stream is transferred to the associated Target Buffer Pointer 167.

The output of an AND circuit 168 is effective to render the remainder of the logic of FIG. 9 effective. Any time a branch instruction is decoded in I-register 35, a line 169 will be enabled. One interlock which is required to permit continued decoding of a conditional branch in the I-register 35, is the recognition by an Inverter 170 and an AND circuit 171 that there is at least one instruction buffer which is not busy, and can receive a target instruction stream. The final input to AND circuit 168 is from an Inverter 172 which receives the signal on line 136 from FIG. 6 indicating that the coding of the conditional branch instruction in I-register 35 is such that it is to be considered not a branch instruction. Therefore, sequencing of instructions should continue in the same instruction stream.

As mentioned earlier, each of the three instruction streams A, B, and C have an associated Active trigger 173, 174, and 175, which when set, will activate I-Fetch Sequencers 176, 177, and 178. The I-Fetch Sequencers are a set of triggers and logic which monitor the associated Instruction Buffers 31, 32, and 33 which are active, and determines the full or empty status of the registers which comprise the buffers to initiate instruction fetches as required. The state of the sequencers for each of the instruction streams is used to control I-Buffer A, B, or C In-gates on a line labeled 179.

When a conditional branch instruction has been decoded and the execution control information transferred to the Instruction Queue 42 of FIG. 3A, the output 180 of AND circuit 168 will be effective at a gate represented at 181 to transfer the contents of the Next Target Stream Pointer 162 to the Instruction Queue 42 register which receives the conditional branch execution control information, and will enter this information into the Target Buffer Pointer 167 of the register. At the same time, the contents of the Next Target Stream Pointer 162 will be effective through lines 182 and 183 to turn on the Active trigger and Busy trigger associated with the Instruction Buffer 31, 32 or 33 which is to be activated to receive the target instruction designated by the address information of the conditional branch instruction. Rendering the Active trigger set will activate the proper I-Fetch Sequencers to initiate instruction fetch for the target instruction stream. The new state of the Busy triggers 163, 164, and 165 will update the Next Target Stream Pointer 162.

The output 180 of AND circuit 168 is also effective at an AND circuit 184 and an AND circuit 185. If the logic of FIG. 6 indicates that the conditional branch instruction is known to be successful, signal 134 will be effective at AND circuit 185 to cause the present setting of the Decoding Pointer 158, through a gate 186, to turn off the Active trigger of the Instruction Buffer 31, 32, or 33 from which the conditional branch instruction was obtained. This is possible because it is known that the next instruction to be executed is to come from the target instruction stream.

In those situations where the logic of FIG. 6 has provided a signal on line 132 indicating that the conditional branch instruction will probably be successful (Guess Successful), AND circuit 184 will provide an output and energize a gate represented at 187, to cause the setting of the Next Target Stream Pointer 162, represented on line 182, to be effective to set the Decoding Pointer 158 with the same value. This is required to indicate that the next instruction to be executed after the conditional branch instruction will probably come from the target instruction stream, and should be transferred to the I-register 35 of FIG. 3A, and is controlled by the I-register In-gate signal 159. If the logic of FIG. 6 has not produced the Guess Successful signal 132, then the Decoding Pointer 158 is left in its present state and instruction decoding is continued in the same instruction stream that contained the conditional branch instruction. This is based on the assumption that the branch will not be successful, and that instruction decoding should continue in the same instruction stream. If the conditional branch is not of the known successful type, indicated on line 134, then the active trigger of the instruction stream containing the conditional branch instruction is left in an active state to continue instruction fetch requests as required.

The Execution Pointer 160 identifies the instruction stream from which instructions are being transferred to the E-function 23 for execution. In response to the execution result signals transferred back to the logic of FIGS. 7 and 8, the Execution Pointer 160 must be set to the proper value identifying the instruction stream to be utilized for further transfer of instructions. Therefore, the energization of signal lines 151 through 154 from the logic of FIG. 8 have a large effect on the setting of the Execution Pointer 160. The Execution Pointer 160 identifies the instruction stream of the conditional branch instruction which caused the signals on lines 151 through 154. If the Guess Successful signal 132 was produced, the Decoding Pointer 158 was set to identify the target instruction stream. If signal line 154 is energized, indicating the branch was unsuccessful (a wrong guess), a gate represented at 188 will be enabled to transfer the setting of the Execution Pointer 160 to the Decoding Pointer 158 on a line 189. This has the effect of causing the instruction, next succeeding the conditional branch instruction in the same instruction stream, to be transferred to the I-register 35. Energizing gate 188 will also have the effect, on lines 190 and 191, of streams other than the instruction stream that contained the conditional branch instruction and instruction next succeeding it in the same instruction stream.

If it was assumed that the conditional branch instruction would not be successful, the Decoding Pointer 158 would have remained set to identify the instruction stream containing the conditional branch instruction. If the branch proved to be successful, (a wrong guess) line 152 from the logic of FIG. 8 would be energized. This represents a situation where decoding should have proceeded from the target instruction stream, and that execution of the next instruction by the E-function 23 should be from the target instruction stream. Therefore, line 152 will be effective at a gate represented at 192, to cause the Target Buffer Pointer 167 contents, represented on a line 193, to be effective on lines 194 and 195, to set both the Decoding Pointer 158 and Execution Pointer 160 to identify the target instruction stream. The Decoding Pointer 158 will then indicate that the target instruction should be transferred to the Instruction Register 35 for decoding, and that the next instruction to be transferred to the E-function 23 should come from the target instruction stream identified by the Execution Pointer 160. The enabling of gate 192 will also be effective on line 191 to deactivate all the Active and Busy triggers for the instruction buffers, other than the instruction buffer containing the target instruction stream represented by the Target Buffer Pointer 167.

Whether the original guess for a conditional branch instruction was that it would be successful or unsuccessful, and it is determined from the execution result signals that this guess was wrong, either line 152 or line 154 will be enabled. These lines will be effective on a line 196 to reset all the instruction execution control information transferred to the Instruction Queue 42 of FIG. 3A. This is required because the instructions decoded subsequent to the conditional branch instruction, whether from the same instruction stream or the target instruction stream, will not now be executed by the E-function 23. Based on the wrong guess, the Decoding Pointer 158 and Execution Pointer 160 will now identify the proper instruction stream, and instruction decoding and execution from the proper instruction stream can proceed.

If the conditional branch instruction executed was unsuccessful, and this was a correct guess, line 153 from the logic of FIG. 8 will enable a gate represented at 197. This will cause the contents of the Target Buffer Pointer 167, as represented on lines 193, 198, and ultimately line 199, to cause the Active and Busy triggers to be reset for the Instruction Buffer 31, 32, or 33 which was activated to receive the instructions fetched from the target instruction stream. Although the instructions from the target instruction stream were prefetched in anticipation of their possible use, they will not be utilized, and since the original guess was that the branch would be unsuccessful, the Decoding Pointer 158 and Execution Pointer 160 were not changed, and should remain in their present state.

If the conditional branch instruction executed was successful, and this was a correct guess, line 151 will enable gates represented at 200 and 201. This indicates that the next instruction that should be transferred to the E-function 23 for execution, is the target instruction identified by the address information of the conditional branch instruction. Therefore, the instruction buffer represented by the Target Buffer Pointer 167 is the instruction buffer from which further execution should proceed, and this information is transferred from line 193 through gate 200, to line 202, to set the Execution Pointer 160 to the same value. Prior to setting the Execution Pointer 160 to correspond to the setting of the Target Buffer Pointer 167, gate 201 will be effective to cause line 199 to turn off the Active and Busy trigger associated with the Instruction Buffer 31, 32, or 33 which is the Instruction buffer that contained the conditional branch instruction. Since the original guess as to the success of the conditional branch instruction was correct, the previous enabling of AND gate 184 and gate 187 would have set the Decoding Pointer 158 to the value of the target instruction stream buffer. Since the guess was correct, the Decoding Pointer 158 will remain at this value for further instruction decoding.

In view of the fact that three sets of Instruction Buffers 31, 32, and 33 have been provided in the IPPF 20, it is possible to decode a conditional branch instruction from instruction stream A, which will cause instruction stream B to be fetched. Subsequent decoding of a conditional branch instruction from instruction stream B, can cause a target instruction stream C to be fetched. It is also evident that since all of the pointers have two binary bits, it would be possible to add a fourth set of instruction buffers, and thereby have the capability of predecoding three conditional branch instructions. The logic of FIG. 9 is such that, as the execution result signals of conditional branch instructions are returned to the IPPF 20, a proper sequence of execution control information presented to the E-function 23 will be maintained.

FIG. 10 shows timing diagrams involved with instruction fetch requests made by the IPPF 20 to the PSCF 21. The diagram at A shows the timing for those operations where a Fetch request is made at 203, and the instruction requested is contained in the high speed buffer, or cache, of the PSCF, so that data will be available on the bus at 205. The instruction fetched will be available on the Data Bus 34 of FIG. 3A on the second cycle following the fetch.

The wave form at B shows the timing if the PSCF 21 is unable to return an instruction on the second cycle following the request. The PSCF 21 will return a signal shown at 206, indicating Fetch Delayed, which occurs 1¼ cycle after the Fetch request. This signal is on for one cycle. When the PSCF 21 is ready to return the data at some later time, it will generate the Advance signal 207, signalling the IPPF 20 that data will be on the Data Bus 34, 2¼ cycles later.

The wave form at C occurs in situations where the PSCF 21 must reject the fetch, and will turn on a trigger signal at 208 indicating that the Fetch request has been Rejected. The IPPF 20 must then reinitiate the operation after the delayed fetch. The state of a No Delayed Fetch trigger is such that when it is off as shown at 209, this indicates that the rejection has been because there is another delayed fetch in progress. When an advanced signal is received at 210 from the previous request which had been delayed, the No Delayed Fetch trigger will be turned on at 210 signalling the IPPF 20 to reinitiate the instruction Fetch at 211.

Figure 11:
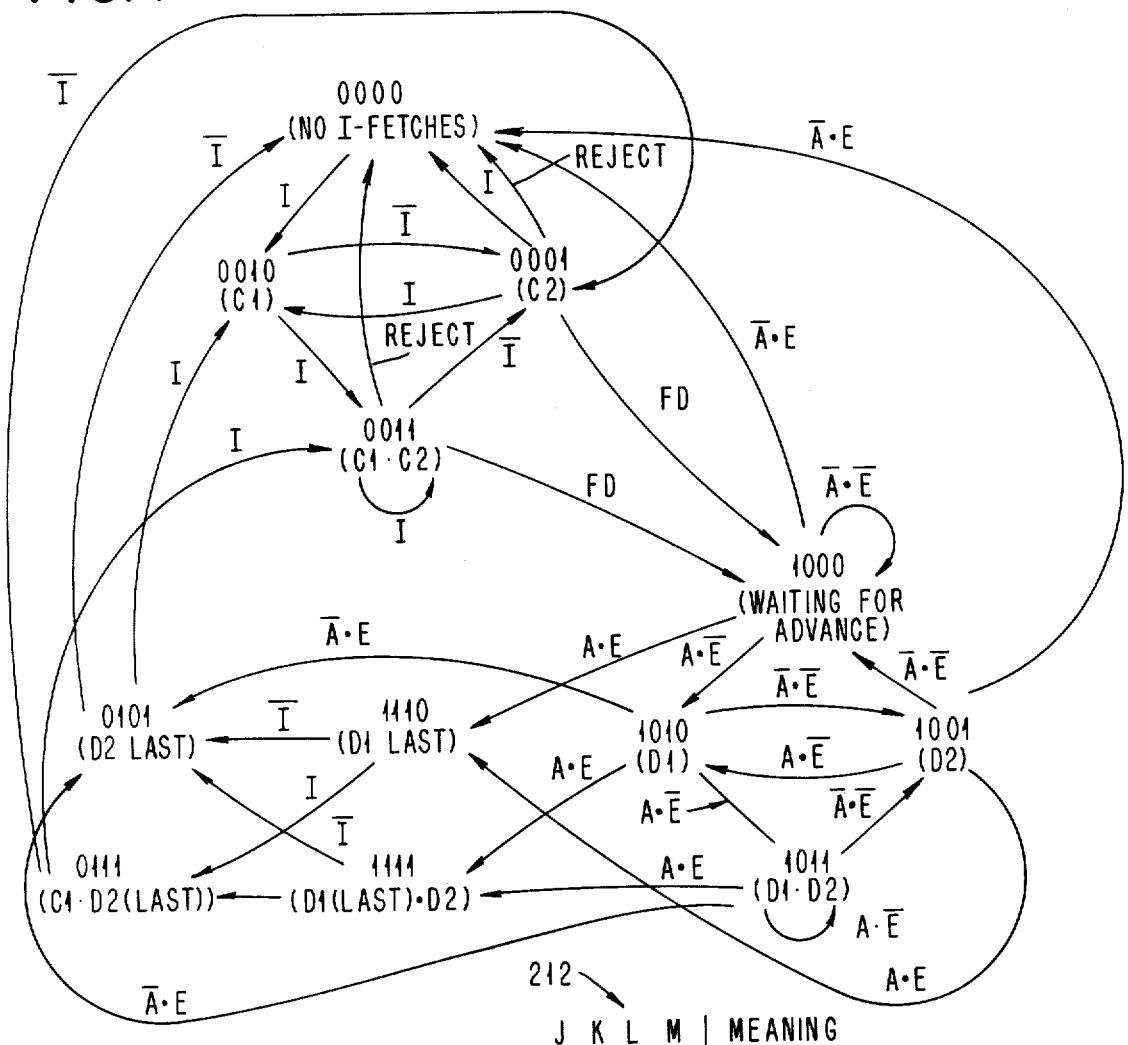
FIG. 11 is a state diagram of the instruction fetch sequencer associated with each instruction stream buffer.

FIG. 11 shows a state diagram and a table representing the various settings of four sequence triggers shown generally at 212. These are the I-Fetch Sequence Triggers 176, 177, and 178 of FIG. 9 associated with each set of Instruction Buffers 31, 32, or 33. These triggers indicate status of any instruction fetch request for a particular one of the instruction buffers, and indicate when the gates to the inputs of the registers should be enabled to receive instructions from the Data bus 34 shown in FIG. 3A. The C1 cycles and C2 cycles are cycles required for an instruction fetch when the instruction is found in the high speed buffer, or cache, of the PSCF 21. The C2 cycle indicates the time at which the Data Bus 34 should be sampled. The reference to D1 and D2 cycles are with reference to cycles occurring after return of the advance signal from the PSCF 21 when a delayed instruction fetch has occurred. Reference to D1 (last) and D2 (last) cycles are those delayed fetch request cycles that have been created because an instruction fetch request required the instructions to be transferred from main storage to the high speed buffer. In these situations, four double words, or a block of instructions, will be returned to the IPPF 20. The signal E shown in the legend, will be the indication from the PSCF 21 that the last double word of a block instruction fetch is being returned. Through all the various sequences of instruction fetches, delayed fetches, rejections, etc., the sequence triggers 212 will eventually reach a state where the M trigger will be a binary 1. When the M trigger is a binary 1, and there is no reject or delay, the Doubleword is on the Data Bus 34, and should be ingated to the appropriate instruction buffer.

FIG. 12 is a timing diagram relating to the decoding of an instruction in I-register 35 of FIG. 3A, and the transfer of the execution control information to the Instruction Queue 42, followed by transfer of this information to the Control Store Address Register 125 of FIG. 4 in the E-function 23. The Instruction Queue 42 has four register positions into which information is gated in response to the setting of an Inpointer (INPTR) which steps in sequence from register to register. The execution information is gated out of the Instruction Queue 42, to the Control Store Address Register 125 in response to the setting of an outpointer (OUTPTR). The inpointer is shown to be set at position n at 213. When the instruction decode and address formulation has been completed at 214, the execution control information will be transferred at 215 to position n of the Instruction Queue 42, and the inpointer will be set to the value of n+1. When the instruction execution control information is entered into position n, a busy trigger will be turned on at 216. At 217, a trigger indicating that the instruction is ready is turned on. As shown at 218, the OP code portion of the execution control information in register n is constantly applied to the input of the Control Store Address Register 125. When the END OP signal 126 of FIG. 4 is generated at 219, the OP code bits on line 128, and address bits 3 and 4 on lines 129 and 130 will be gated into the Control Store Address Register 125. A trigger will be set indicating that the OP code branch in the Control Store 121 has been taken. When this signal falls at 220, the outpointer will be changed to n+1 at 221, indicating the next of the registers of Instruction Queue 42 to be gated to the E-function 23.

Figure 13B:
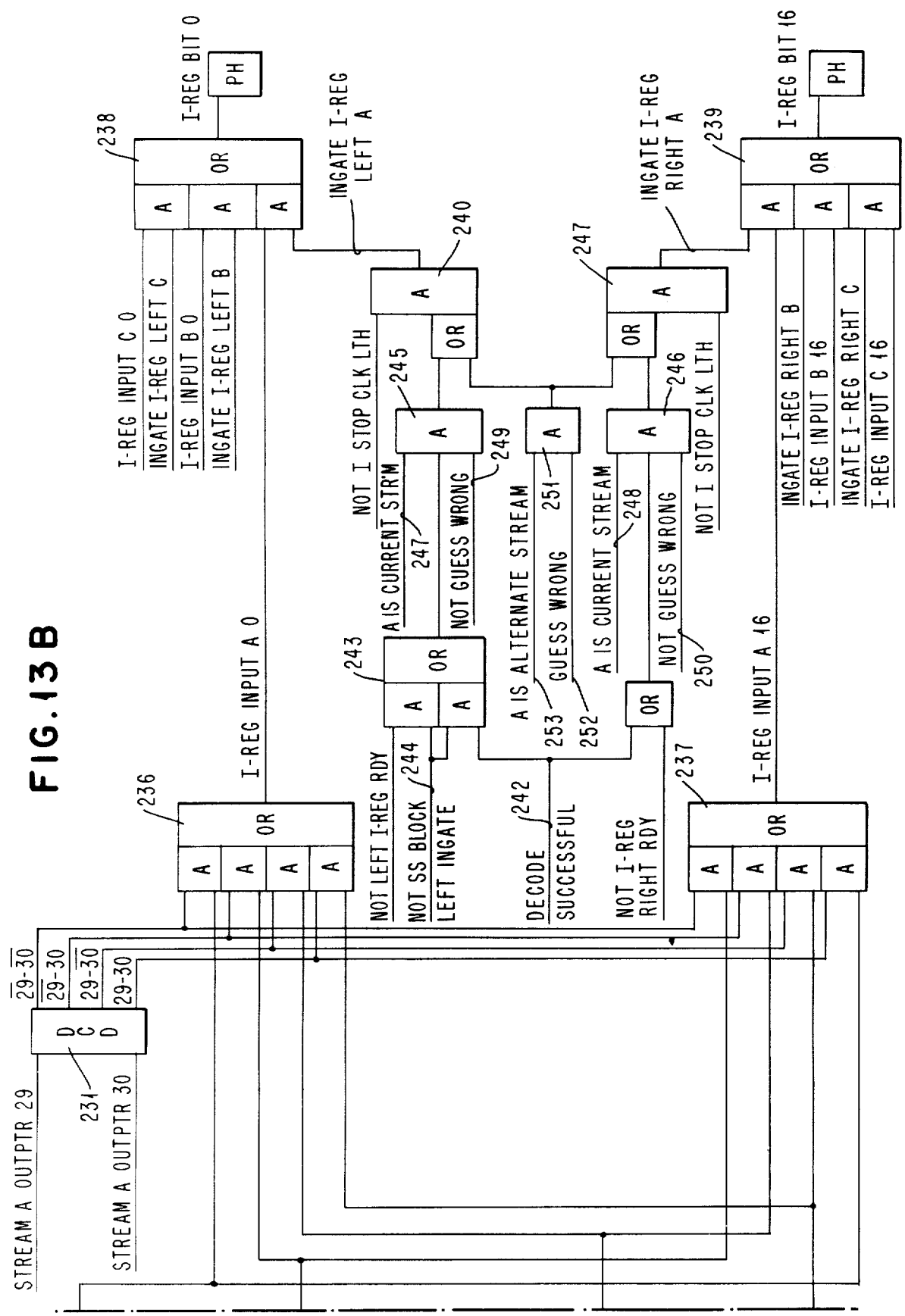

FIGS. 13A and 13B, when arranged in accordance with FIG. 13, depict the ingating and outgating associated with Instruction Buffer 31 associated with instruction stream A. Line 179, labeled In-gate Stream A, corresponds to line 179 shown in FIG. 9, which is activated when instruction fetches are being made for Instruction Buffer 31. Each instruction buffer has associated with it a two-bit Inpointer, bit positions 27 and 28 of which are initialized in accordance with the setting of the corresponding Instruction Address register 78. Their settings, indicated on lines 222 and 223 respectively, when decoded in a Decoder 224, will enable, for example, AND gates 225 through 228 when the double word of instruction information received on Data Bus 34 is to be entered into the first of the set of registers making up Instruction Buffer 31. That is, I-buffer A bit positions 0–63 shown in FIG. 3A. As instruction information is gated into Instruction Buffer 31 in accordance with the Inpointer bits 27 and 28, and gated out of the instruction buffer as dictated by the variable length of instructions, the four double-word registers of Instruction Buffer 31 will be filled in sequence.

Decoders 229, 230, and 231, receive the binary state of four triggers comprising an Outpointer for the corresponding instruction buffer. The Outpointer is updated or modified in accordance with the length of instructions transferred to I-register 35 shown in FIG. 3A. The representation of output gates at 36 in FIG. 3A show the various combination of bits that should be transferred from a particular instruction buffer register to I-register 35. For example, if a two-byte instruction is transferred from bits 0 through 16 of the first register of Instruction Buffer 31, the next instruction to be transferred will have its OP code starting at bit position 16 of the same register. Therefore, bit position 0 of I-register 35, which is the first bit of the OP code of any instruction, may be gated from position 0, 16, 32, or 48 of any particular one of the registers of an instruction buffer.

Each of the Instruction Buffers 31, 32, and 33 has a set of OR circuits 232 through 237 which are enabled by a series of four AND circuits, further enabled by the state of the instruction stream Outpointer, to provide an input to I-register 35 bit position 0 or bit position 16, the two bit positions of I-register 35 shown in FIG. 13B. OR circuits 238 and 239 provide the final input to the I-register 35 bit positions 0 or 16. The final gating of information into I-register 35 from Instruction Buffer 31, representing I stream A, comes from AND circuits 240 and 241.

When decoding has been completed of an instruction in I-register 35, a signal Decode Successful on line 242 is generated, and corresponds to the time shown at 215 in FIG. 12. The combination of AND circuits and OR circuits shown at 243 are effective to indicate that I-register 35 does not contain any information, and in the case of I-register 35 bit positions 0 through 15, an indication must be made that the gating is not for the purpose of transferring the final two bytes of a six-byte SS type of instruction signalled on a line 244. The final two bytes of instruction information for an SS type of instruction requires that this information be inserted in bit positions 16 through 31 of I-register 35. AND circuits 245 and 246 are enabled by signals on lines 247 and 248 respectively, which correspond to line 159 of FIG. 9 indicating that instruction stream A is the instruction stream for which decoding is to be effective.

If instruction decoding proceeds from instruction stream A after decoding a conditional branch instruction, instruction stream A is either the original instruction stream or the target instruction stream. If the result of a conditional branch is such that the original guess was correct, indicated by a signal Not Guess Wrong on lines 249 and 250, AND circuits 245 and 246 will be enabled to immediately transfer the next instruction to Instruction Register 35. AND circuit 251 responds in an opposite fashion, when the original guess effected in accordance with the logic shown in FIG. 6 is wrong, and this is signalled on line 252. Instruction stream A would previously have been designated as the alternate stream on line 253, indicating that instruction stream A should gate the next instruction to Instruction Register 35 instead of the other instruction stream, originally thought to have been the source for instructions.

As mentioned previously, OR circuits 238 and 239 are the final input to I-register 35, and there is shown a set of AND circuits associated with instruction stream B and instruction stream C which will be enabled by a line corresponding to that shown at 159 in FIG. 9 indicating that instruction stream as being the stream presently being decoded.

There has thus been shown the ability to transfer instructions into one of three sets of registers making up instruction buffers, when activated, and the controlling of the transfer of instructions from the instruction buffers to an instruction decoding register in accordance with the requirements of conditional branch instructions encountered from the various instruction streams. The sequence of the transfer of instructions for execution to an E-function is monitored and controlled such that more than one conditional branch instruction can be predecoded and awaiting execution while maintaining the proper sequence of execution in the execution unit.

While the invention has been particularly shown and described with references to preferred embodiments thereof, it will be understood by those skilled in the art that the foregoing and other changes in form and details may be made therein without departing from the spirit and scope of the invention.

What is claimed is:

1. In a computer system having storage, instruction processor, and execution unit, said instruction processor including a plurality of instruction buffers with buffer selection and instruction fetching means, each instruction buffer being responsive to said buffer selection means to receive and store, concurrently, at least one instruction from an independent sequence of instructions from said storage, an instruction decoder, instruction gate means interconnecting said instruction decoder and a selected one of said instruction buffers, and an instruction queue comprised of a plurality of queue registers, each said queue register storing execution control information received from said instruction decoder for each instruction decoded, said execution unit including control means, responsive to said execution control information received from each said queue register, for performing the function called for by each said instruction, and providing to said instruction processor, result signals for certain of said instructions, instruction sequencing logic comprising:

branch signalling means, responsive to a branch instruction in said instruction decoder received from a first one of said instruction buffers, for controlling said buffer selection and instruction fetching means to transfer a target instruction from said storage to another of said instruction buffers;

instruction gate control means connected to said instruction gate means, for transferring a next instruction to said instruction decoder after transfer of said execution control information of said branch instruction to said instruction queue;

target buffer indicating means responsive to said branch signalling means, associated with each of said queue registers when storing execution control information of a branch instruction, for indicating said another of said instruction buffer means; and instruction selection means, responsive to said result signals from said execution unit in response to said branch instruction and said associated target buffer indicating means, for selecting the next sequential execution control information to be transferred to said execution unit.

2. In a computer system in accordance with claim 1 wherein:

said instruction processor includes at least three instruction buffers.

3. In a computer system in accordance with claim 2 wherein said branch signalling means includes:

a busy trigger, and instruction fetch sequencing means associated with each of said three instruction buffers;

next target stream pointer means responsive to all said busy triggers for indicating said another of said instruction buffers; and target instruction access means for generating an execute branch signal, connected and responsive to a branch instruction in said instruction decoder and connected to said next target stream pointer means, for setting said busy trigger and initiating said instruction fetch sequencing means of said another of said instruction buffers, and for transferring the indication of said target stream pointer to said target buffer indicating means associated with said queue register storing execution control information of said branch instruction.

4. In a computer system in accordance with claim 3 wherein said branch signalling means includes:

means connected and responsive to the set state of all said busy triggers, and connected to said target instruction access means for inhibiting operation of said target instruction access means.

5. In a computer system in accordance with claim 4 wherein execution of a target instruction fetched in response to certain of said branch instructions is conditioned on the state of a result signal from said execution unit, and wherein said instruction selection means includes:

branch result logic, including means connected and responsive to the state of said result signal, for generating either a branch successful signal or a branch unsuccessful signal; and means, responsive to said branch successful or said branch unsuccessful signal, for selecting the next sequential execution control information of an instruction to be transferred to said execution unit from either said another of said instruction buffers or said first one of said instruction buffers respectively.

6. In a computer system in accordance with claim 5 wherein:

said instruction gate control means includes a decoding pointer for selecting and interconnecting one of said instruction buffers to said instruction decoder, and said instruction selection means further includes:

an execution pointer for indicating which of said instruction buffers was the source of the execution control information transferred to said execution unit;

means responsive to said branch successful signal for transferring the contents of said target buffer indicating means to said decoding pointer and said execution pointer to indicate said another of said instruction buffers, and resetting said busy trigger and said instruction fetch sequencing means of all other of said instruction buffers; and means, responsive to said branch unsuccessful signal for rendering said target buffer indicating means effective to reset said busy trigger and said instruction fetch sequencing means of said another of said instruction buffers.

7. In a computer system in accordance with claim 4 wherein execution of a target instruction fetched in response to certain of said branch instructions is conditioned, and considered successful, based on a particular state of a result signal from said execution unit, and said instruction decoder includes means for selectively producing decode signals including a guess successful signal for those branch instructions normally successful, known successful signal for those branch instructions that will always be successful, no branch signal for those branch instructions that cannot be successful, and coded branch status information associated with each of said queue registers storing execution control information of a branch instruction for identifying the type of branch instruction and therefor the particular state of said result signal wherein:

said instruction gate control means includes a decoding pointer for selecting and interconnecting one of said instruction buffers to said instruction decoder;

said branch signalling means includes means responsive to said no branch signal for inhibiting operation of said target instruction access means; and said instruction selection means further includes, an execution pointer for indicating which of said instruction buffers was the source of the execution control information transferred to said execution unit, means responsive to said execute branch signal, said guess successful signal, and said next target stream pointer for setting said decoding pointer to indicate said another of said instruction buffers, branch result logic, connected and responsive to said coded branch status information and said result signal from said execution unit for generating first, second, third, or fourth control signals representing, respectively, branch unsuccessful/wrong guess, branch unsuccessful/right guess, branch successful/wrong guess, and branch successful/right guess, means responsive to said first control signal for resetting all of said queue registers and said busy triggers and said instruction fetch sequencing means of all said instruction buffers not indicated by said execution pointer, ans for transferring the indication in said execution pointer to said decoding pointer, means responsive to said second control signal for resetting said busy trigger and said instruction fetch sequencing means indicated by said target buffer indicating means, means responsive to said third control signal for resetting all of said queue registers, said busy trigger and said instruction fetch sequencing means of all said instruction buffers not indicated by said target buffer indicating means, and for transferring the indication in said target buffer indicating means to said decoding pointer and said execution pointer, and means responsive to said fourth control signal for resetting said busy trigger and said instruction fetch sequencing means of said instruction buffer indicated by said execution pointer and for transferring the indication in said target buffer indicating means to said execution pointer.

8. In a computer system in accordance with claim 7 wherein said instruction selection means further includes:

means, responsive to said known successful decode signal for resetting said busy trigger and said instruction fetch sequencing means of said instruction buffer indicated by said decoding pointer.

* * * * *